(12) United States Patent
Lightcap et al.

(10) Patent No.: US 8,993,099 B2
(45) Date of Patent: Mar. 31, 2015

(54) STRETCH LAMINATE HAVING NOVEL ADHESIVE PATTERN AND METHODS OF MAKING THE SAME

(75) Inventors: William Lawrence Lightcap, Indian Hill, OH (US); Joseph Hung Lam, Mason, OH (US); Clarissa Maldonado, Cincinnati, OH (US); Kevin Lee Martin, Bonn (DE)

(73) Assignee: The Procter & Gamble Company, Cincinnati, OH (US)

( * ) Notice: Subject to any disclaimer, the term of this patent is extended or adjusted under 35 U.S.C. 154(b) by 1248 days.

(21) Appl. No.: 11/298,025

(22) Filed: Dec. 8, 2005

(65) Prior Publication Data

US 2006/0121252 A1     Jun. 8, 2006

Related U.S. Application Data

(60) Provisional application No. 60/634,157, filed on Dec. 8, 2004.

(51) Int. Cl.
    *B32B 3/02*          (2006.01)
    *B32B 27/12*       (2006.01)
    (Continued)

(52) U.S. Cl.
    CPC ................. *B32B 27/12* (2013.01); *B29C 55/18* (2013.01); *B32B 3/18* (2013.01); *B32B 5/022* (2013.01);
    (Continued)

(58) Field of Classification Search
    CPC ............ B32B 2250/05; B32B 2250/40; B32B 2305/20; B32B 2307/51; B32B 2307/726; B32B 2432/00; B32B 2437/00; B32B 2535/00; B32B 2555/00; B32B 2555/02; B32B 27/08; B32B 27/12; B32B 37/1292; B32B 37/01
    USPC ............... 442/328, 381, 394; 428/195.1, 201, 428/192, 194
    See application file for complete search history.

(56) References Cited

U.S. PATENT DOCUMENTS

| | | |
|---|---|---|
| 4,940,464 A | 7/1990 | Van Gompel et al. |
| 5,092,861 A | 3/1992 | Nomura et al. |

(Continued)

FOREIGN PATENT DOCUMENTS

JP          62-091266        4/1987

OTHER PUBLICATIONS

International Search Report.

*Primary Examiner* — Elizabeth Cole
(74) *Attorney, Agent, or Firm* — Andrew J. Mueller; Laura L. Whitmer; Charles R. Ware

(57) ABSTRACT

A stretch laminate having a first nonwoven material, a second nonwoven material, an elastic film. The elastic film may be interposed between said first and second nonwoven material. The elastic film has a first longitudinal side edge and a second longitudinal side edge. The stretch laminate further has a first plane of adhesive having differing amounts of adhesive as measured laterally within the stretch laminate. The differing amounts of adhesive being controllable. The first plane of adhesive being interposed between the first nonwoven material and the elastic film. The stretch laminate further has a second plane of adhesive having differing amounts of adhesive as measured laterally within the stretch laminate. The differing amounts of adhesive being controllable. The second plane of adhesive being interposed between the second nonwoven material and the elastic film. Each of the above elements are substantially laminated together to form a laminate. The laminate is activated to form the stretch laminate.

12 Claims, 24 Drawing Sheets

(51) Int. Cl.
| | | |
|---|---|---|
| B29C 55/18 | (2006.01) |
| B32B 3/18 | (2006.01) |
| B32B 5/02 | (2006.01) |
| B32B 5/04 | (2006.01) |
| B32B 5/14 | (2006.01) |
| B32B 5/26 | (2006.01) |
| B32B 7/14 | (2006.01) |
| B32B 27/08 | (2006.01) |
| B32B 37/12 | (2006.01) |
| B32B 37/14 | (2006.01) |
| D04H 13/00 | (2006.01) |

(52) U.S. Cl.
CPC . *B32B 5/04* (2013.01); *B32B 5/142* (2013.01); *B32B 5/26* (2013.01); *B32B 7/14* (2013.01); *B32B 27/08* (2013.01); *B32B 37/1292* (2013.01); *B32B 37/144* (2013.01); *D04H 13/006* (2013.01); *B32B 2250/05* (2013.01); *B32B 2250/40* (2013.01); *B32B 2305/20* (2013.01); *B32B 2307/51* (2013.01); *B32B 2307/726* (2013.01); *B32B 2432/00* (2013.01); *B32B 2437/00* (2013.01); *B32B 2535/00* (2013.01); *B32B 2555/00* (2013.01); *B32B 2555/02* (2013.01)
USPC ........ 428/192; 428/194; 428/195.1; 428/201; 442/328; 442/381; 442/394

(56) References Cited

U.S. PATENT DOCUMENTS

| | | | |
|---|---|---|---|
| 5,209,801 A * | 5/1993 | Smith | 156/161 |
| 5,246,433 A | 9/1993 | Hasse et al. | |
| 5,569,234 A | 10/1996 | Buell et al. | |
| 5,683,036 A | 11/1997 | Benecke et al. | |
| 5,804,286 A * | 9/1998 | Quantrille et al. | 428/198 |
| 5,883,028 A * | 3/1999 | Morman et al. | 442/394 |
| 5,897,545 A | 4/1999 | Kline et al. | |
| 5,957,908 A | 9/1999 | Kline et al. | |
| 6,120,487 A | 9/2000 | Ashton | |
| 6,120,489 A | 9/2000 | Johnson et al. | |
| 6,632,212 B1 | 10/2003 | Morman et al. | |
| 2002/0177376 A1* | 11/2002 | Welch et al. | 442/50 |
| 2003/0233082 A1 | 12/2003 | Kline et al. | |
| 2006/0292328 A1* | 12/2006 | Baldauf et al. | 428/77 |

* cited by examiner

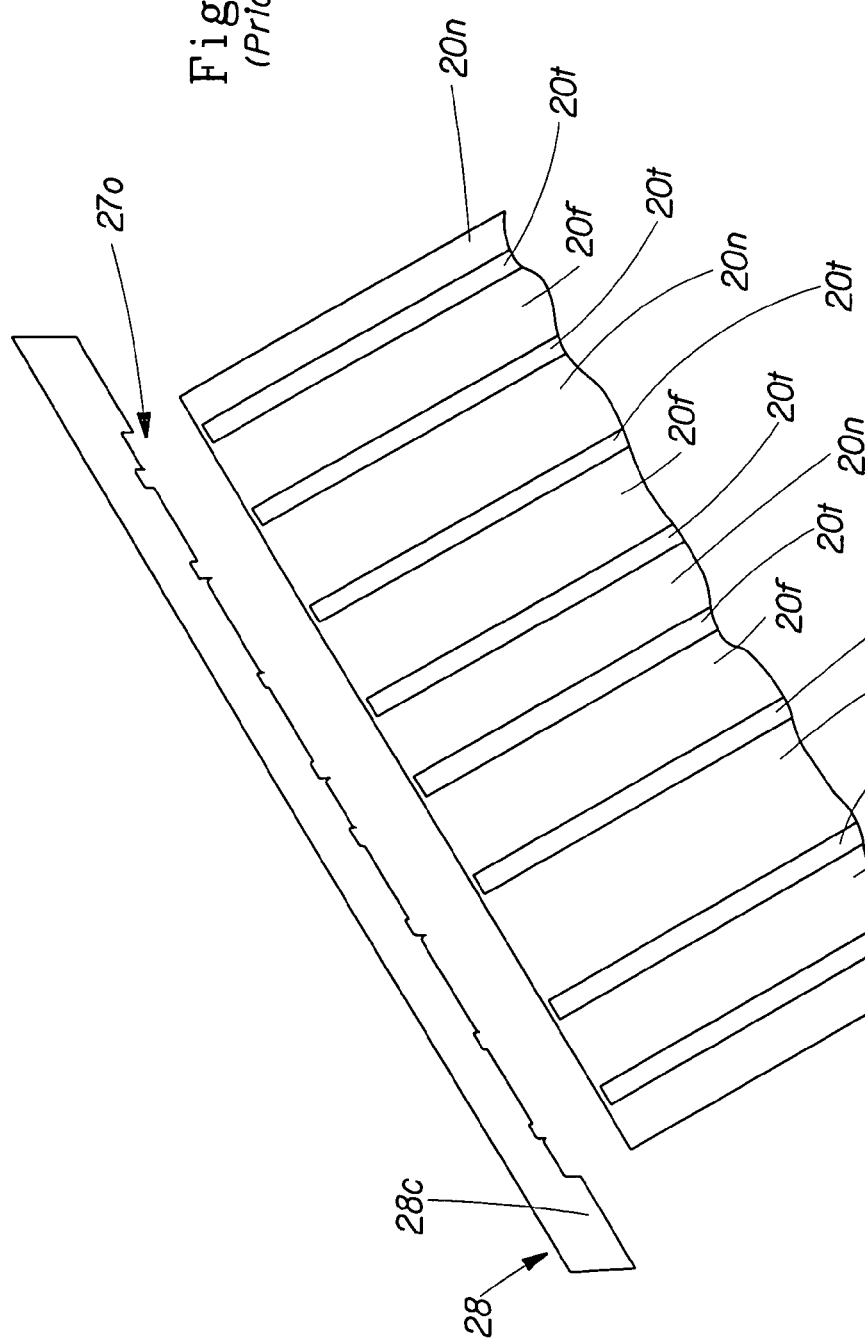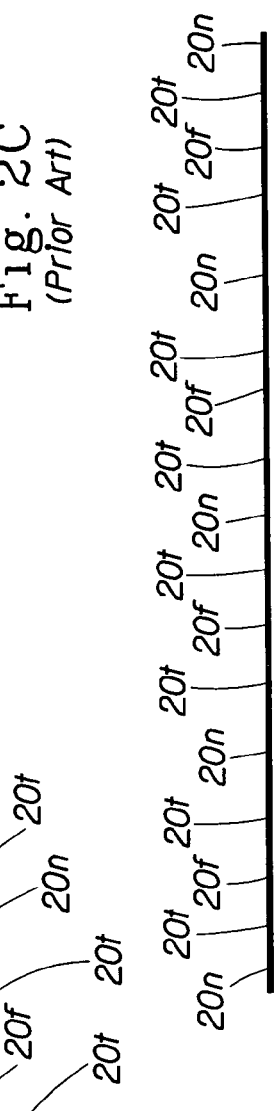

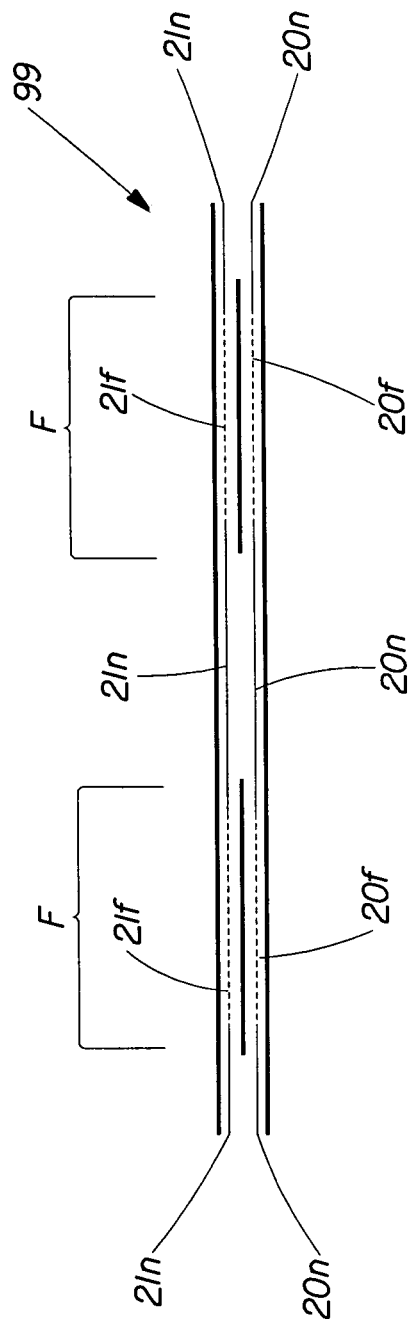
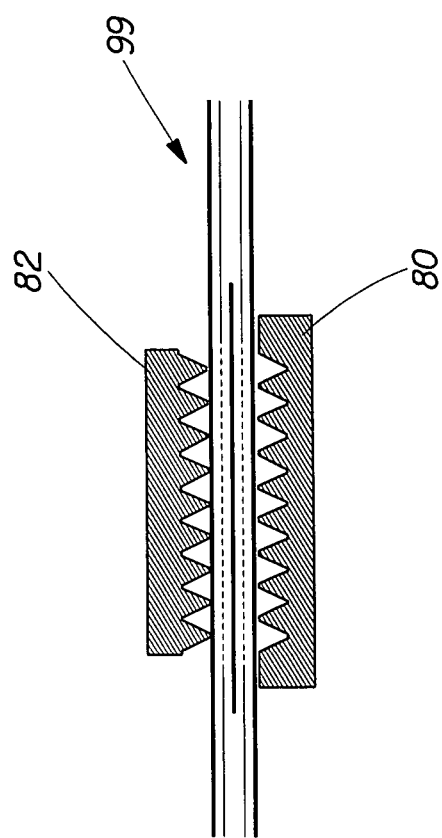
Fig. 3D (Prior Art)
Fig. 3E (Prior Art)

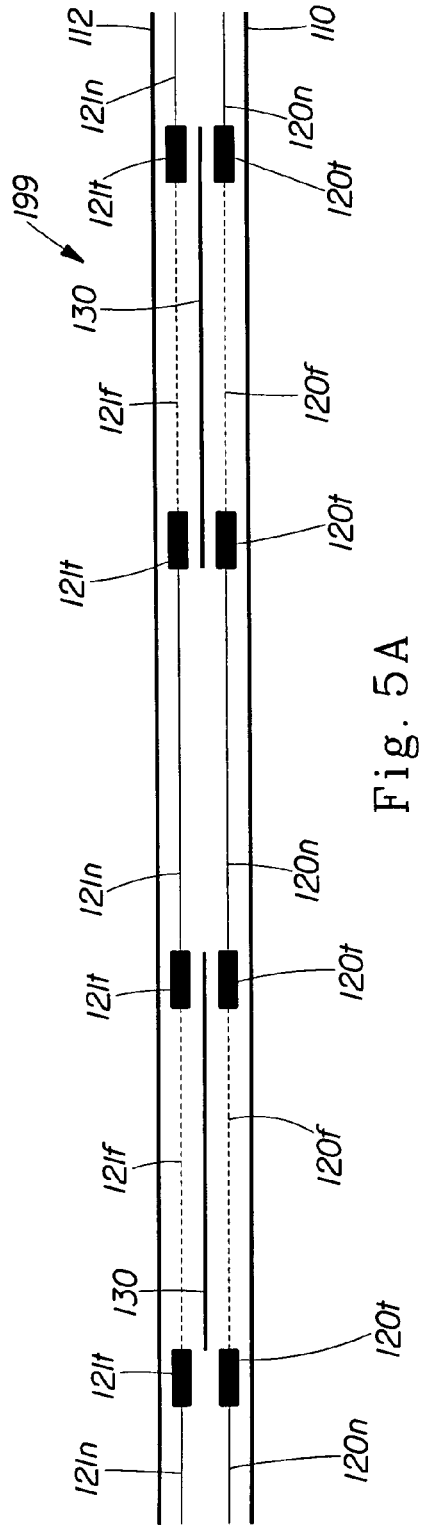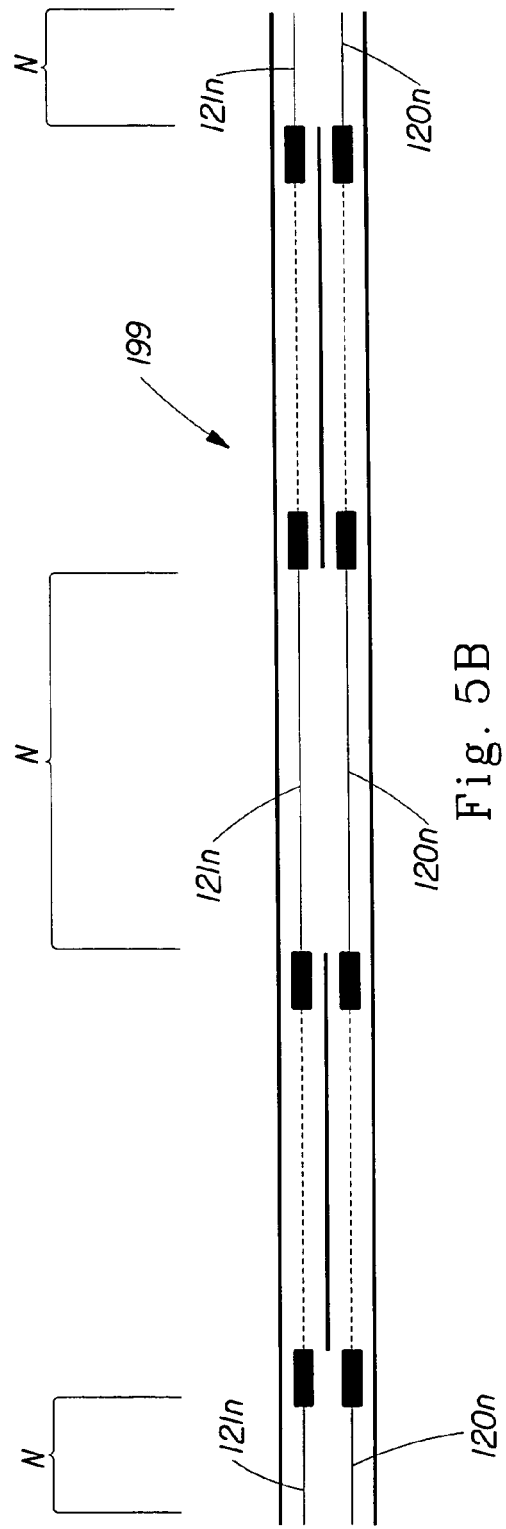

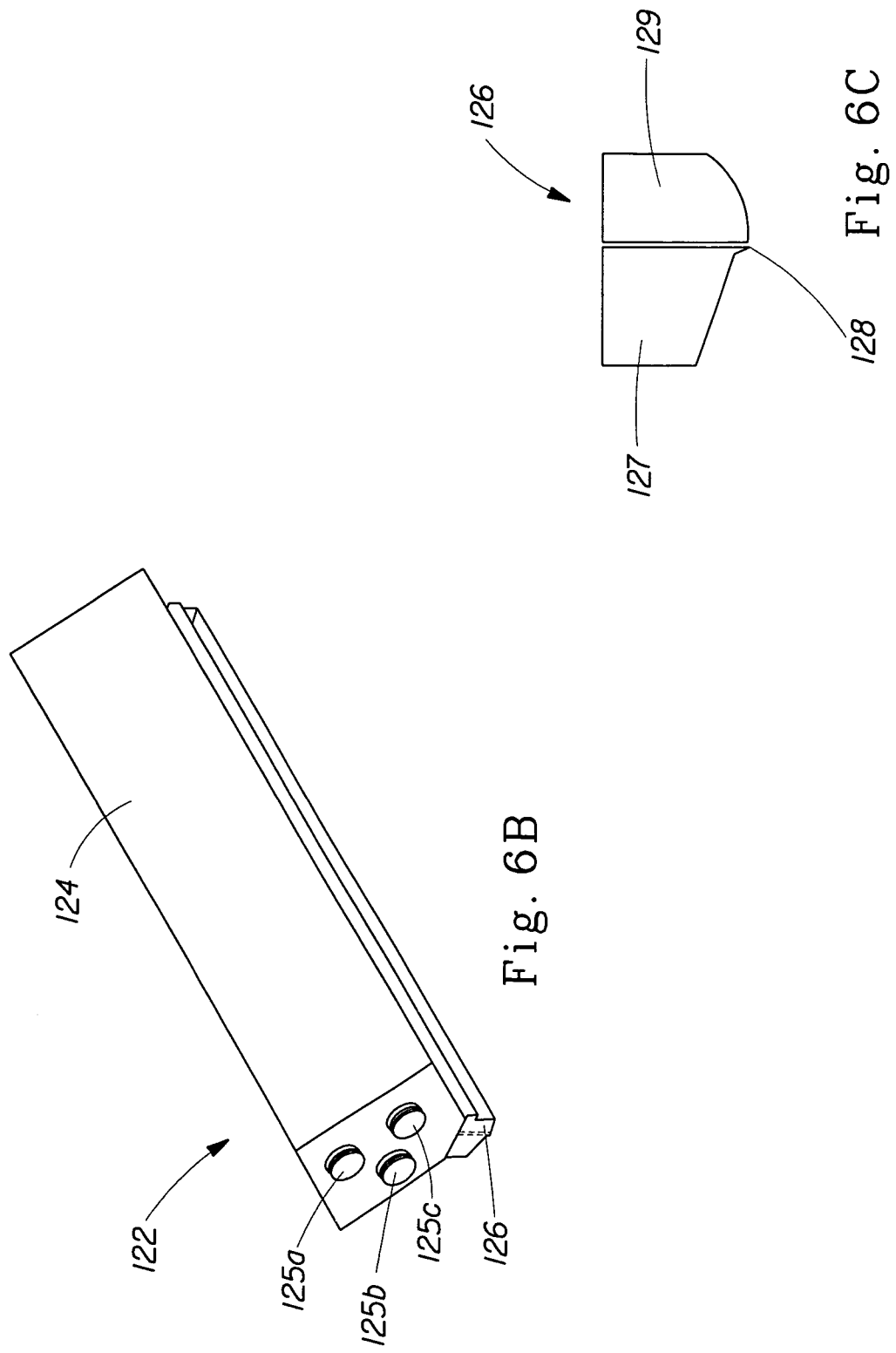

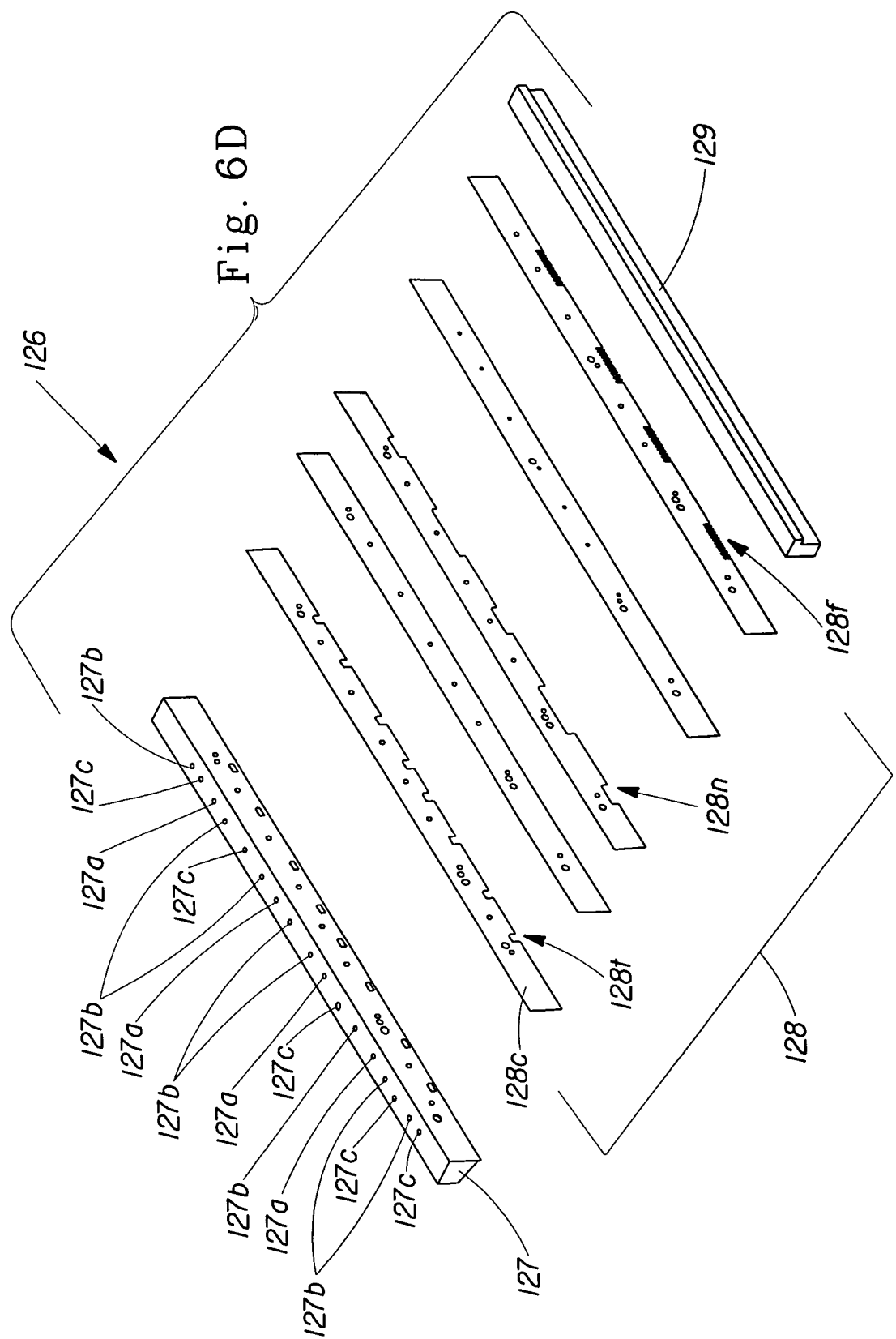

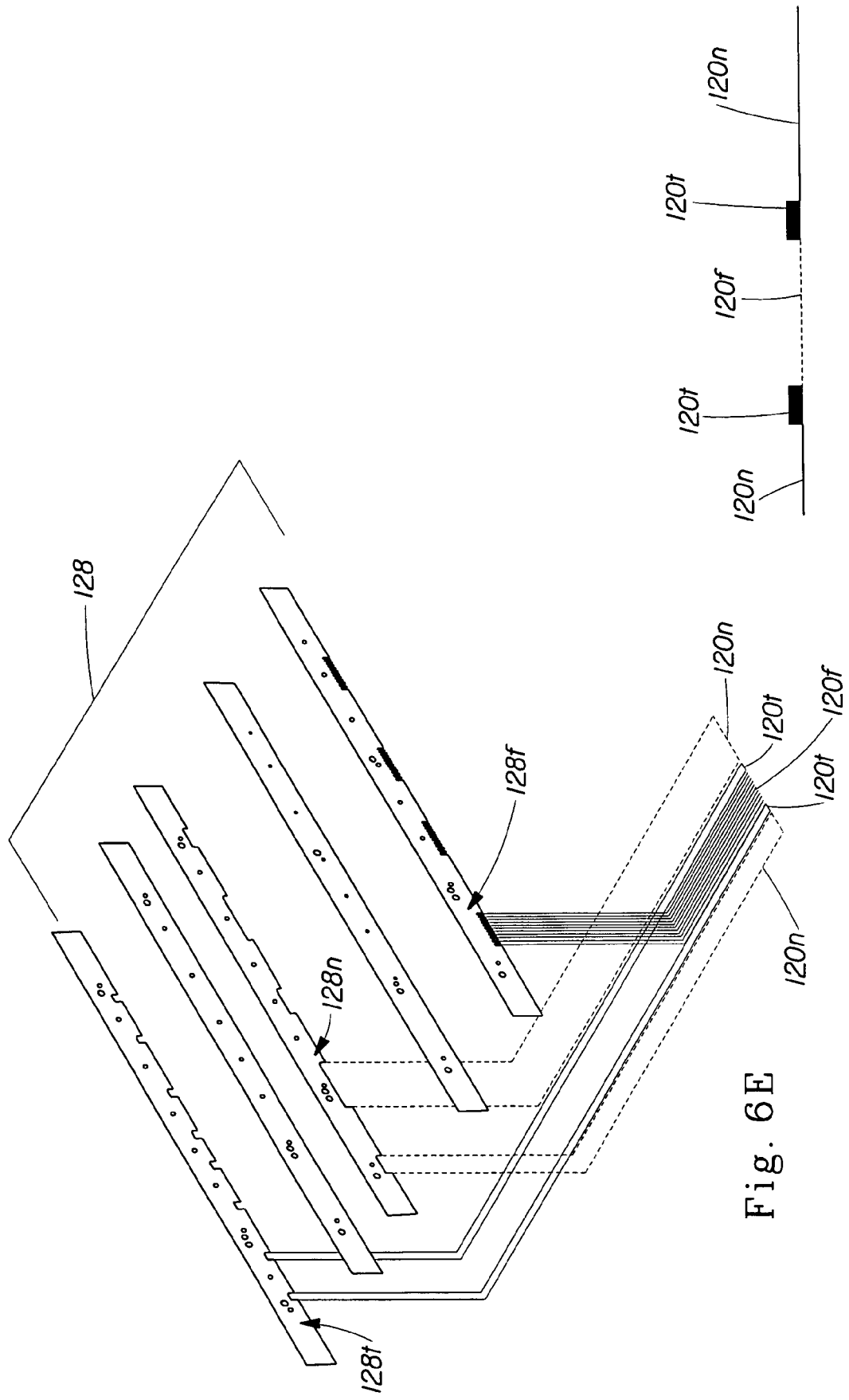

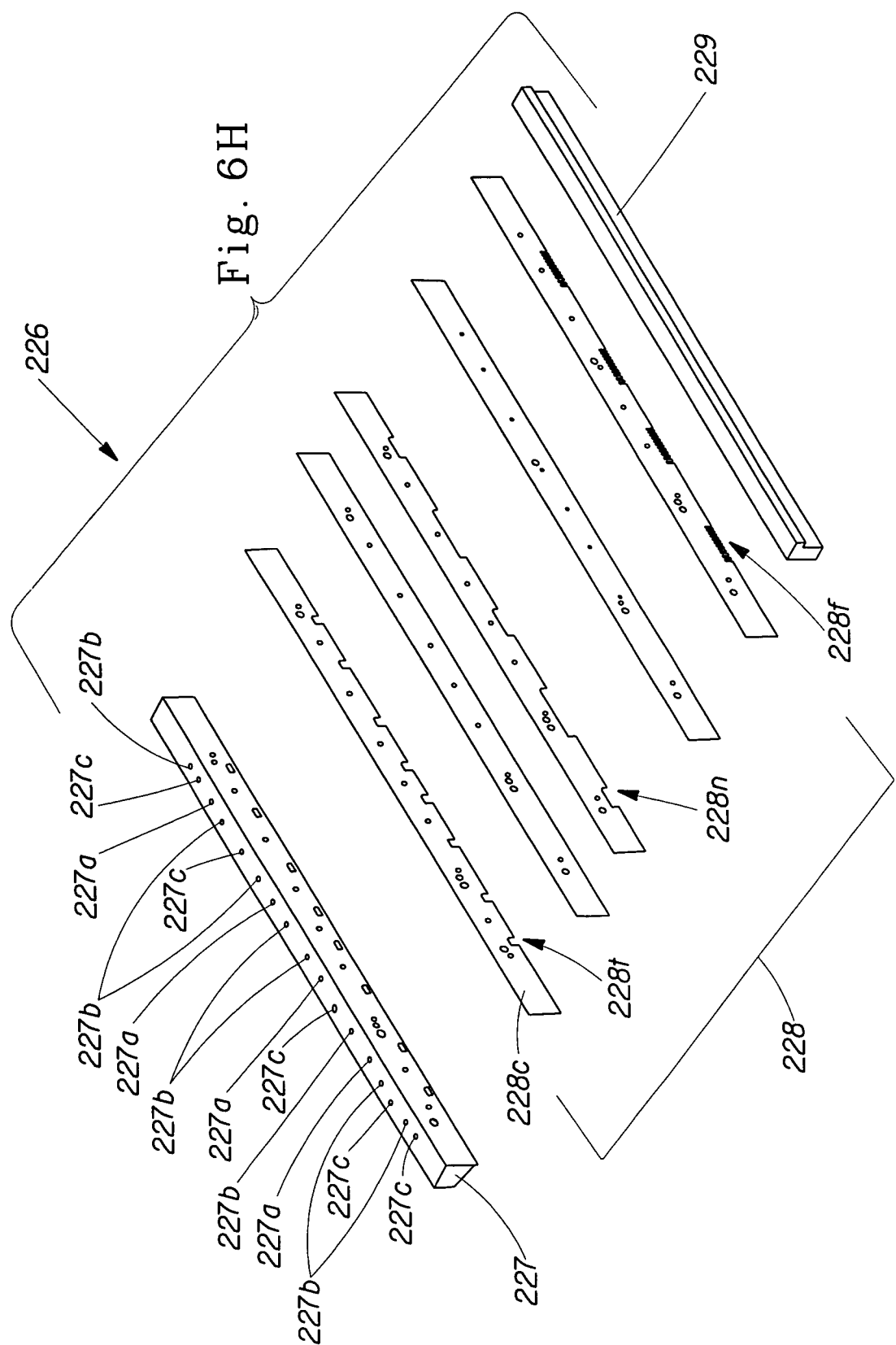

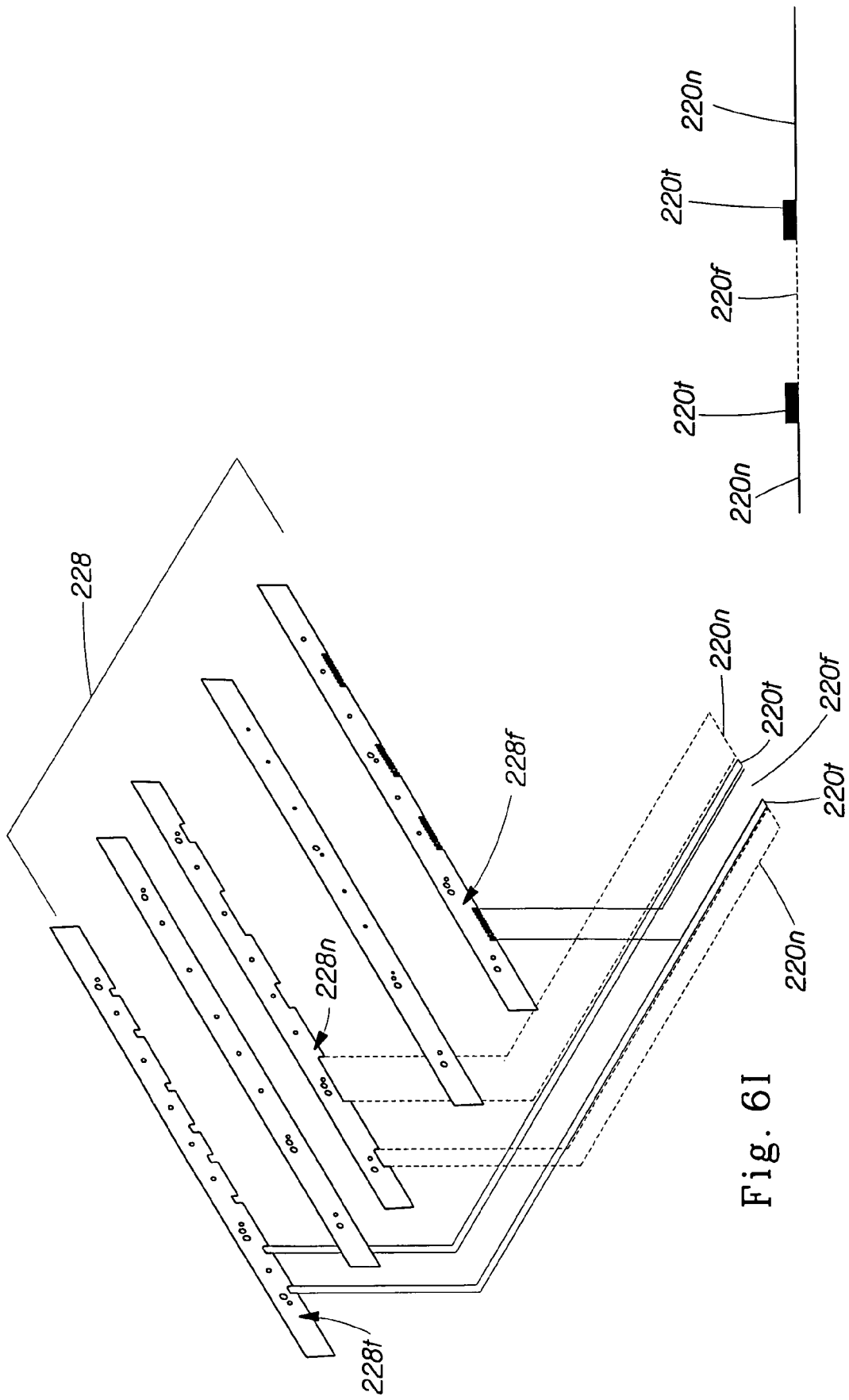

STRETCH LAMINATE HAVING NOVEL ADHESIVE PATTERN AND METHODS OF MAKING THE SAME

CROSS REFERENCE TO RELATED APPLICATIONS

This application claims the benefit of U.S. Provisional Application No. 60/634,157 filed Dec. 8, 2004, the disclosure of which is hereby incorporated by reference as if set forth in its entirety herein.

FIELD OF THE INVENTION

The present invention relates to stretch laminates having novel adhesive patterns, and the apparatus and methods for making the same. More particularly, the present invention relates to stretch laminates having novel adhesive patterns providing improved activation characteristics.

BACKGROUND

Stretch laminates are commonly used in the consumer-products industry. For example, stretch laminates are used in the manufacturing of disposable absorbent articles, such as disposable diapers. Conventional stretch laminates often comprise of at least two nonwoven materials having at least one elastic film sandwiched therebetween. In the manufacturing of such conventional laminates, the use of adhesive is often employed.

FIG. 1a shows a schematic of a conventional manufacturing process 1000 for the making of conventional stretch laminates. A first web of nonwoven material 10 is supplied in a direction as indicated by arrow 11. Adhesive 20 is applied to said first nonwoven 10 by way of an adhesive applicator 22. A second web of nonwoven material 12 is supplied in a direction as indicated by arrow 13. Adhesive 21 is applied to said second nonwoven 12 by way of an adhesive applicator 23. A web of elastic film 30 is supplied in a direction as indicated by arrow 31. These three webs of materials are sandwiched together between combining rolls 70, 72. Said combining rolls rotate in a direction as indicated by arrows 71, 73, respectively. Once these three webs of materials are sandwiched together, they are subsequently activated between activation rolls 80, 82. Said activation rolls rotate in a direction as indicated by arrows 81, 83, respectively. Activation of said webs by way of activation rolls 80, 82 is sometimes referred to as "ring rolling". After said activation, the resulting product is a stretch laminate 99.

FIG. 1b shows the applicator adhesive 22 from that of FIG. 1a. Adhesive applicator 22 may comprise of a manifold 24, an adhesive inlet 25 and a slot 26. Referring now to FIG. 1c slot 26 may comprise of a backplate 27, shim 28 and a front plate 29. Referring now to FIG. 1d, an exploded view of slot 26 is shown. As can be seen, backplate 27 may comprise of a plurality of adhesive inlet ports 27a. Adhesive may be introduced into slot 26 through said adhesive inlet ports. Said adhesive may then exit through adhesive outlet port 27b, whereupon the adhesive will come into contact with shim 28. Shim 28 may consist of multiple regions including a closed portion 28c, an open portion 28o and a partitioned section 28f. The functionality of these various regions will be discussed later.

FIG. 1e shows the exemplary shim 28 from that of FIG. 1d. Further, an exemplary deposition of adhesive is shown having exited through shim 28. For instance, adhesive intended to be placed between said first and second nonwoven materials and also laterally outboard of elastic film 30 is identified as 20n. Additionally, an adhesive intended to be placed between said first and second nonwoven materials and also on the outboard edges of elastic film 30 is identified as 20t. Finally, an adhesive intended to be placed between said first and second nonwoven materials and also laterally positioned inboard the edges of elastic film 30 is identified as 20f. Referring now to FIG. 1f, a cross-sectional view of the adhesive deposition patterned from FIG. 1e is shown. As can be appreciated from this cross-sectional view, the adhesive within the region intended to be placed above or below elastic film 30 is discontinuous while the adhesive in the other regions is continuous. As is also depicted in this figure, and as experienced through conventional use, supplying adhesive in this manner (i.e. via a single source of adhesive supply) does not properly yield continuous regions of adhesive having varying and controllable amounts. The importance of such inadequacy within the prior art will be further examined later.

FIG. 1g shows the first web of nonwoven material 10 having regions of adhesive. For example, a full coverage of adhesive 20 is applied in the areas surrounding the subsequent placement of elastic film 30. In the areas which will be underneath the subsequent placement of elastic film 30, a partial coverage of adhesive 20f is applied. In this particular example, a series of parallel lines of adhesive is applied. Similar to the first web of nonwoven material 10, the second web of nonwoven material 12 also has regions of adhesive. For example, a full coverage of adhesive 21n is applied in the areas surrounding the subsequent placement of elastic film 30. In the areas which will be underneath the subsequent placement of elastic film 30, a partial coverage of adhesive 21f is applied. In this particular example, a series of parallel lines of adhesive is applied. As is also shown in this conventional embodiment, two webs of elastic film 30, are aligned with said parallel lines of adhesive 20f, 21f. Partial application of adhesive in this manner is important because these regions will be subjected to ring rolling as discussed above; therefore, these regions of material must be sufficiently elastic so as not to create pinholes. The areas of full coverage, 20n, 21n will not be significantly activated, rather these areas of full coverage provide for maximum adherence of first and second nonwoven materials.

FIG. 2a shows another exemplary slot 26 having a backplate 27, shim 28 and frontplate 29. Similar to that of the slot shown in FIG. 1d, backplate 27 has adhesive inlet ports 27a. However, within this particular example, shim 28 does not contain partitioned regions; rather shim 28 contains only open regions 27o and closed regions 28c. Referring now to FIG. 2b, the corresponding adhesive deposition for shim 28 of FIG. 2a is provided. As can be appreciated, said deposition of adhesive is continuous along the entire cross-section of adhesive (see FIG. 2c). And while shim 28 contains open regions 27o having varying heights, the resulting adhesive deposition (as shown in FIG. 2c) does not have complementary variations in amount which are controllable because of the inadequacies of supplying adhesive in the manner as shown (e.g., use of a single adhesive supply supplying adhesive via a single inlet). Referring now to FIG. 2d, a first web of nonwoven material 10 having regions of adhesive is shown. Within this particular example, a full coverage of adhesive is applied throughout, unlike the example in FIG. 1g. Similar to the first web of nonwoven material 10, the second web of nonwoven material 12 also has a full coverage of adhesive 20. Full coverage of adhesive in this manner presents several technical difficulties including pinholes during activation.

FIG. 3a illustrates a cross-sectional view of the conventional stretch laminate 99 from FIG. 1g. As can be seen, a first web of nonwoven material 10 is shown at the base of said laminate and a second web of nonwoven material 12 is shown at the top of said laminate. In this particular example, two elastic films 30 are shown in special relationship with each other and sandwiched between said webs of nonwoven material. A first plane of adhesive is shown between said first web of nonwoven material 10 and said elastic film 30. Within said first plane of adhesive are distinct regions of adhesive, namely, continuous application of adhesive 20n and discontinuous application of adhesive 20f. The continuous application of adhesive 20n is substantially located near the ends and outside of elastic film 30. The discontinuous application of adhesive 20f is substantially located between the ends of elastic film 30. Similarly, a second plane of adhesive is shown between said second web of nonwoven material 12 and said elastic film 30. Within said second plane of adhesive are distinct regions of adhesive, namely, continuous application of adhesive 21n and discontinuous application of adhesive 21f. The continuous application of adhesive 21n is substantially located near the ends and outside of elastic film 30. The discontinuous application of adhesive 21f is substantially located between the ends of elastic film 30.

FIG. 3b shows the cross-sectional view of FIG. 3a with particular emphasis on the continuous application of adhesive 20n, 21n. One of the primary purposes of application of adhesive within these regions is the proper lamination of first and second webs of nonwoven materials. As can be seen and appreciated, however, in the areas in which elastic film 30 is not present there exists a redundant supply of adhesive 20n, 21n. More importantly, it is often a problem of the prior art that this redundant supply of adhesive will penetrate the first and/or second webs of nonwoven materials thus causing performance and/or aesthetic issues. For this reason, the amount of adhesive applied in these first and second planes of adhesive is often kept below a fixed maximum value so as to minimize bleed through and above a fixed minimum value so as to provide sufficient adhesive for lamination.

FIG. 3c shows the cross-sectional view of FIG. 3a with particular emphasis on the continuous application of adhesive 20t, 21t within the areas identified with the letter "T". These areas of adhesive, which are located at the ends of elastic film 30, are often referred to as tackdown areas. Because this area of adhesive serves the primary purpose of tacking down the elastic film 30 into place, a sufficient amount of adhesive must be supplied. Unlike the areas of adhesive outside of elastic film 30, these tack down areas gain the benefit of the presence of elastic film 30 such that bleeding of adhesive through first and second web of nonwoven material is not a major concern. Unfortunately, the designs of conventional stretch laminates and their respective manufacturing processes do not provide proper means for applying differing amounts of adhesive to address the competing interests of bleed through and sufficient tack down.

FIG. 3d shows the cross-sectional view of FIG. 3a with particular emphasis on the discontinuous application of adhesive 20f, 21f within the areas identified with the letter "F". These areas of adhesive, which are located between the ends of elastic film 30 is applied in a discontinuous pattern so as to provide for sufficient elasticity of elastic film 30 during activation. Even though the adhesive applied in these areas is discontinuous, attempts to provide for sufficient tack down and lamination often results in too much adhesive being applied within these regions. Thus causing pinholes during activation.

FIG. 3e shows a schematic of an exemplary ring rolling process involving a first activation roll 80 having protruding teeth and a second activation roll 82 having protruding teeth, which mates those of said first activation roll. While in reality the teeth of first and second activation rolls 80, 82 are positioned in an engaging manner, this schematic shows said rules being separated so as to show the proper orientation and alignment of stretch laminate 99 in relationship to said rules. As can be seen and appreciated, the discontinuous application of adhesive 20f, 21f are significantly located between said teeth while the continuous application of adhesive 20n, 21n are not significantly located between said teeth. Such orientation and alignment is common throughout the industry.

FIG. 4a shows a cross-sectional view of another exemplary, conventional stretch laminate 99. In this particular example, the first and second plane of adhesive application 20n, 21n is entirely continuous. This conventional stretch laminate may be easier to manufacture, thus perhaps cheaper; however, the problems of pinholes during activation (see FIG. 4b) may be more prevalent. This type of conventional stretch laminate is often used in applications wherein material barrier properties are not critical.

What is needed is a stretch laminate having differing amounts of adhesive so as to properly be activated. The present invention describes such a product and method of making the same.

SUMMARY OF THE INVENTION

A stretch laminate having a first nonwoven material, a second nonwoven material, an elastic film. The elastic film may be interposed between said first and second nonwoven material. The elastic film has a first longitudinal side edge and a second longitudinal side edge. The stretch laminate further has a first plane of adhesive having differing amounts of adhesive as measured laterally within the stretch laminate. The differing amounts of adhesive being controllable. The first plane of adhesive being interposed between the first nonwoven material and the elastic film. The stretch laminate further has a second plane of adhesive having differing amounts of adhesive as measured laterally within the stretch laminate. The differing amounts of adhesive being controllable. The second plane of adhesive being interposed between the second nonwoven material and the elastic film. Each of the above elements are substantially laminated together to form a laminate. The laminate is activated to form the stretch laminate.

Further, the first plane of adhesive may have (1) a first portion of adhesive being laterally located between said first and second longitudinal side edges of said elastic film, said first portion of adhesive being defined as film adhesive, (2) a second portion of adhesive being laterally located near at least one longitudinal side edge of said elastic film, said second portion of adhesive being defined as tackdown adhesive and (3) a third portion of adhesive being laterally located outboard of said longitudinal edges of said elastic film, said third portion of adhesive being defined as nonwoven adhesive. The film adhesive may be discontinuous. The film adhesive may be continuous and have an application amount less than that of said tackdown adhesive. The nonwoven adhesive may have an application amount less than that of said tackdown adhesive. All of the above may hold true for the second plane of adhesive.

A method for making the stretch laminate of the present invention which includes at least one adhesive applicator having a plurality of shims. The plurality of shims may be designated for application of either film adhesive, tackdown adhesive or nonwoven adhesive. Such method may include the use of a plurality of adhesive supplies to provide designated adhesive to the plurality of shims which are designated for application of either film adhesive, tackdown adhesive or nonwoven adhesive.

Another exemplary stretch laminate in accordance with the present invention includes a first nonwoven material, a second nonwoven material and an elastic film. The elastic film being interposed between said first and second nonwoven material, said elastic film having a first longitudinal side edge and a second longitudinal side edge. The laminate further having (1) a first plane of adhesive, said first plane of adhesive being interposed between said first nonwoven material and said elastic film; (2) a second plane of adhesive, said second plane of adhesive being interposed between said second nonwoven material and said elastic film, wherein said first and second plane of adhesive have differing amounts of adhesive from each other as measured laterally-within the stretch laminate, said differing amounts of adhesive being controllable; (3) a third plane of adhesive, said third plane of adhesive being interposed between said second nonwoven material and said elastic film; and (4) a fourth plane, said fourth plane of adhesive being interposed between said second nonwoven material and said elastic film, wherein said third and fourth plane of adhesive have differing amounts of adhesive from each other as measured laterally within the stretch laminate, said differing amounts of adhesive being controllable. Each of the above elements being substantially laminated together to form a laminate. The laminate is activated to form the stretch laminate.

BRIEF DESCRIPTION SHOWN IN THE DRAWINGS

While the specification concludes with claims particularly pointing out and distinctly claiming the subject matter that is regarded as the present invention, it is believed that the invention will be more fully understood from the following description taken in conjunction with the accompanying drawings. None of the drawings are necessarily to scale.

FIG. 1b shows a conventional adhesive applicator which is used in the manufacturing process of FIG. 1a;

FIG. 2b is a schematic of an exemplary adhesive deposition pattern of FIG. 2a;

FIG. 2c shows a cross-sectional view of the exemplary adhesive pattern of FIG. 2b;

FIG. 3d shows a cross-sectional view of the stretch laminate of FIG. 3a with particular emphasis on the adhesive applied laterally in board of the ends of the elastic film;

FIG. 3e shows a conventional activation process in the proper alignment of the conventional stretch laminate;

FIG. 4b shows a conventional activation process with the proper alignment of the conventional stretch laminate of FIG. 4a;

FIG. 5a is a cross-sectional view of a stretch laminate in accordance with the present invention;

FIG. 5b shows the novel stretch laminate of FIG. 5a with particular emphasis on the adhesive applied laterally outboard of the elastic film;

FIG. 5e shows a cross-sectional view of an exemplary activation process in the proper alignment of the novel stretch laminate of FIG. 5a;

FIG. 6b shows an exemplary adhesive applicator which may be used in the manufacturing process of FIG. 6a;

FIG. 6c shows a side elevational view of the slot of adhesive applicator within FIG. 6b;

FIG. 6d shows an exploded view of the slot within FIG. 6c;

FIG. 6e is a schematic of the adhesive deposition pattern from that of the plurality of shims which are included in the adhesive applicator of FIG. 6d;

FIG. 6f is a schematic, cross-sectional view of the adhesive deposition pattern of FIG. 6e;

FIG. 6h shows another exemplary shim design for a slot of an adhesive applicator in accordance with the present invention;

FIG. 6i is a schematic of the adhesive deposition from that of the plurality of shims which are included in the adhesive applicator of FIG. 6h;

FIG. 6j is a schematic, cross-sectional view of the adhesive deposition of FIG. 6i;

DETAILED DESCRIPTION OF THE INVENTION

Figure 1A:
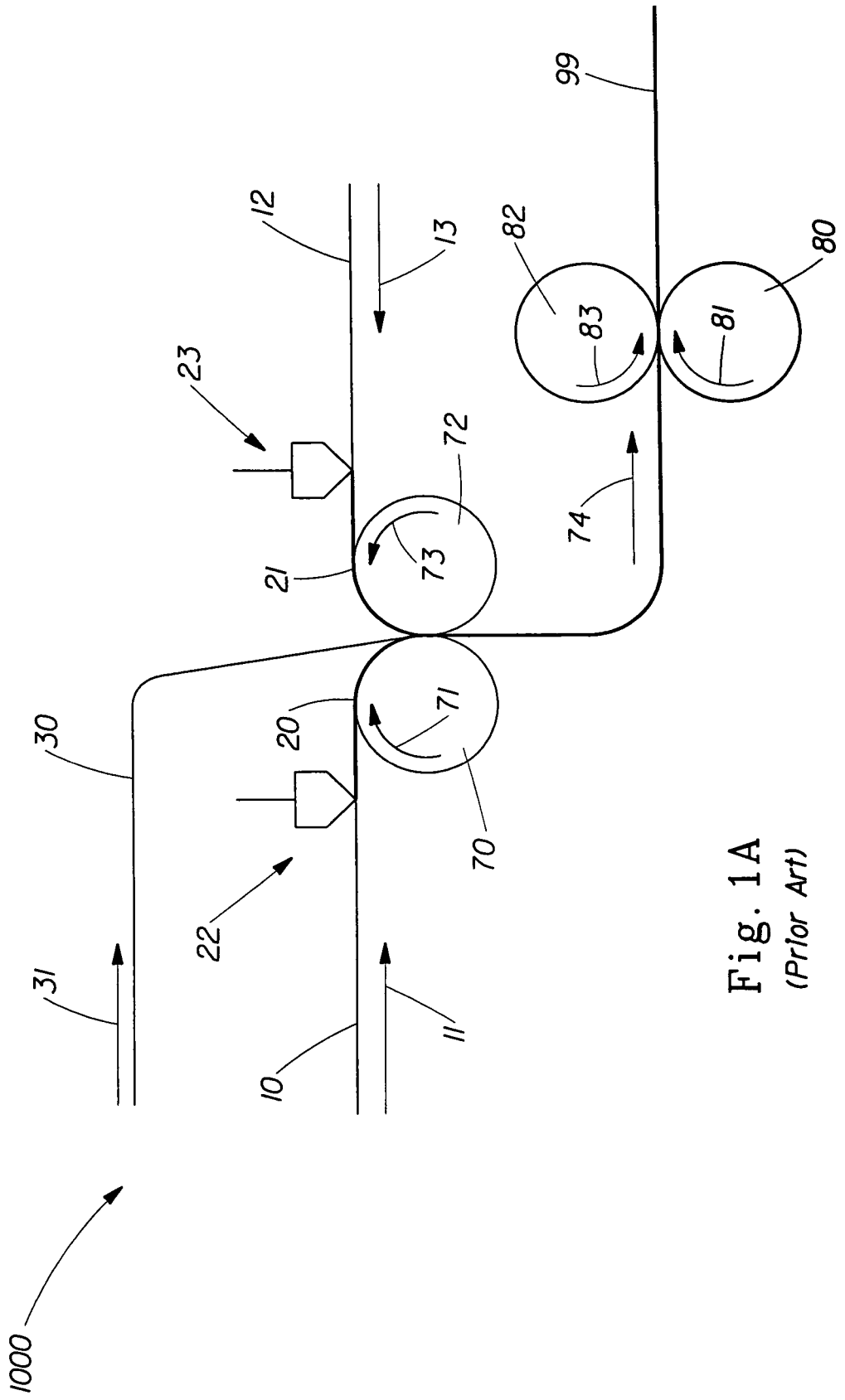
FIG. 1a shows a conventional manufacturing process for the making of conventional stretch laminates.
Figure 1C:
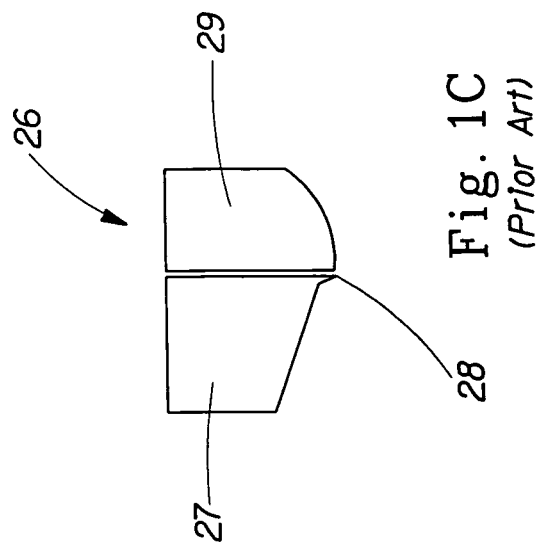
FIG. 1c shows a cross-sectional view of the conventional adhesive applicator of FIG. 1b.
Figure 1B:
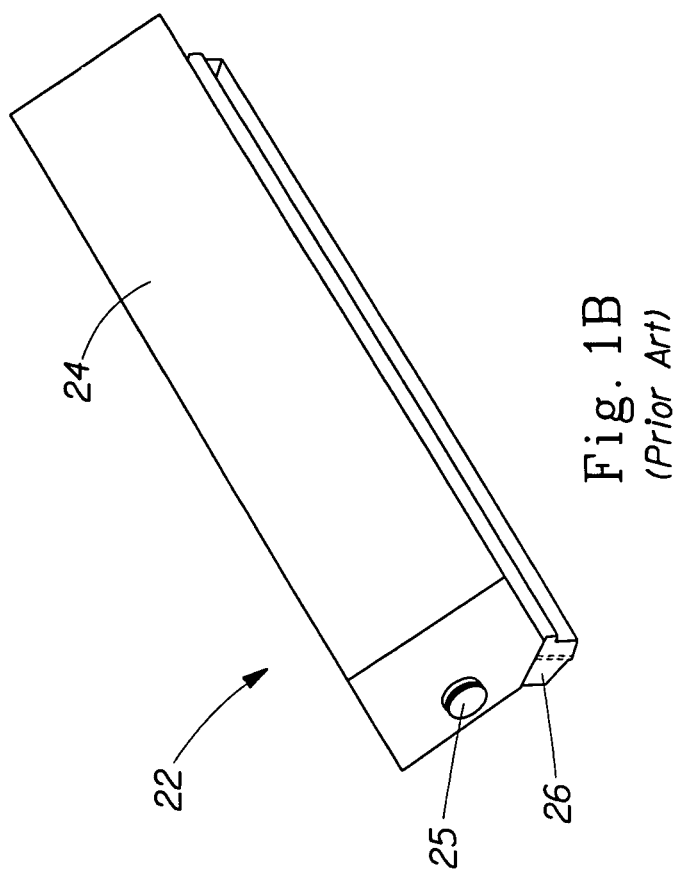
Figure 1D:
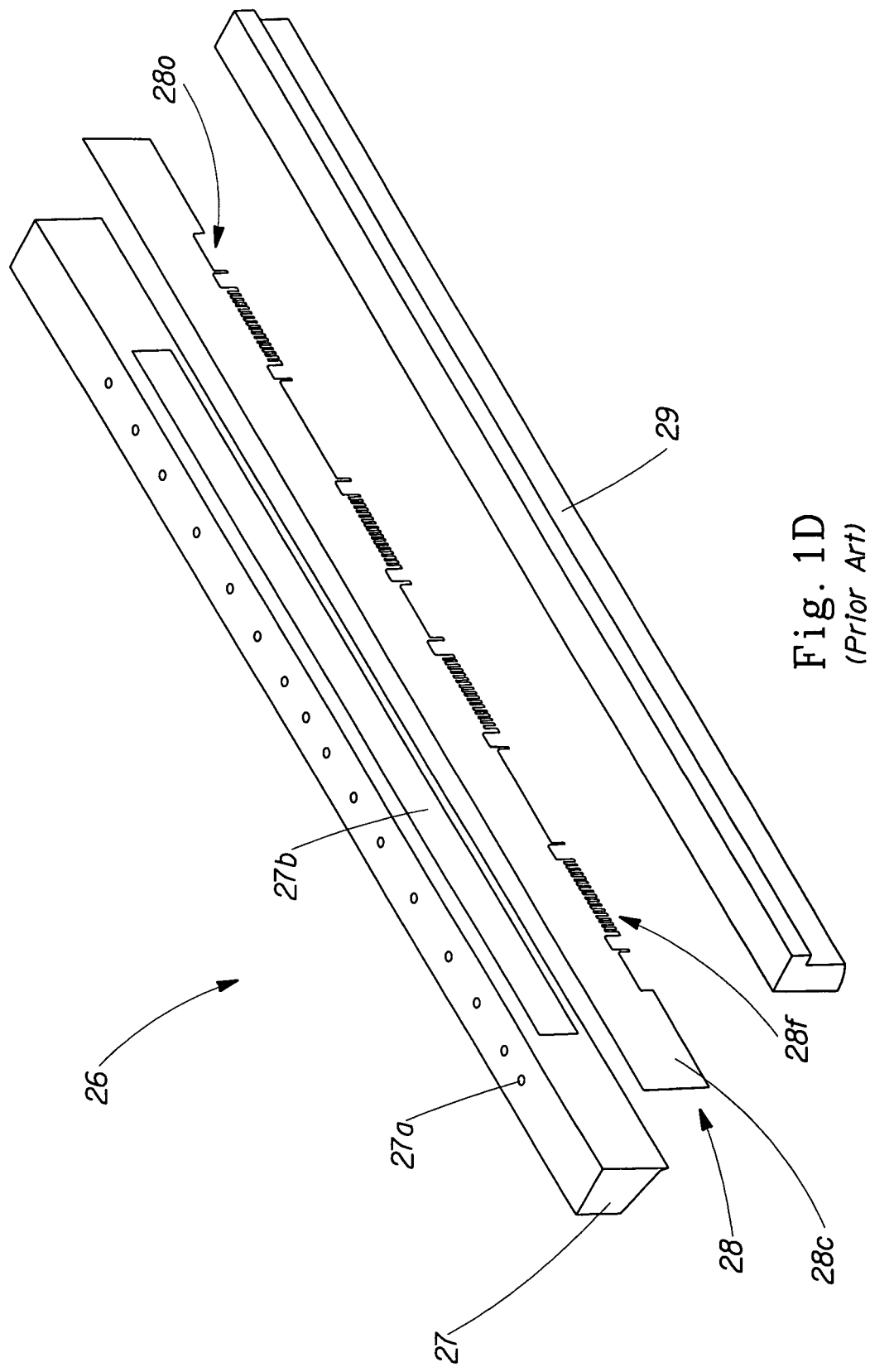
FIG. 1d shows an exploded view of the conventional adhesive applicator of FIG. 1b.
Figure 1E:
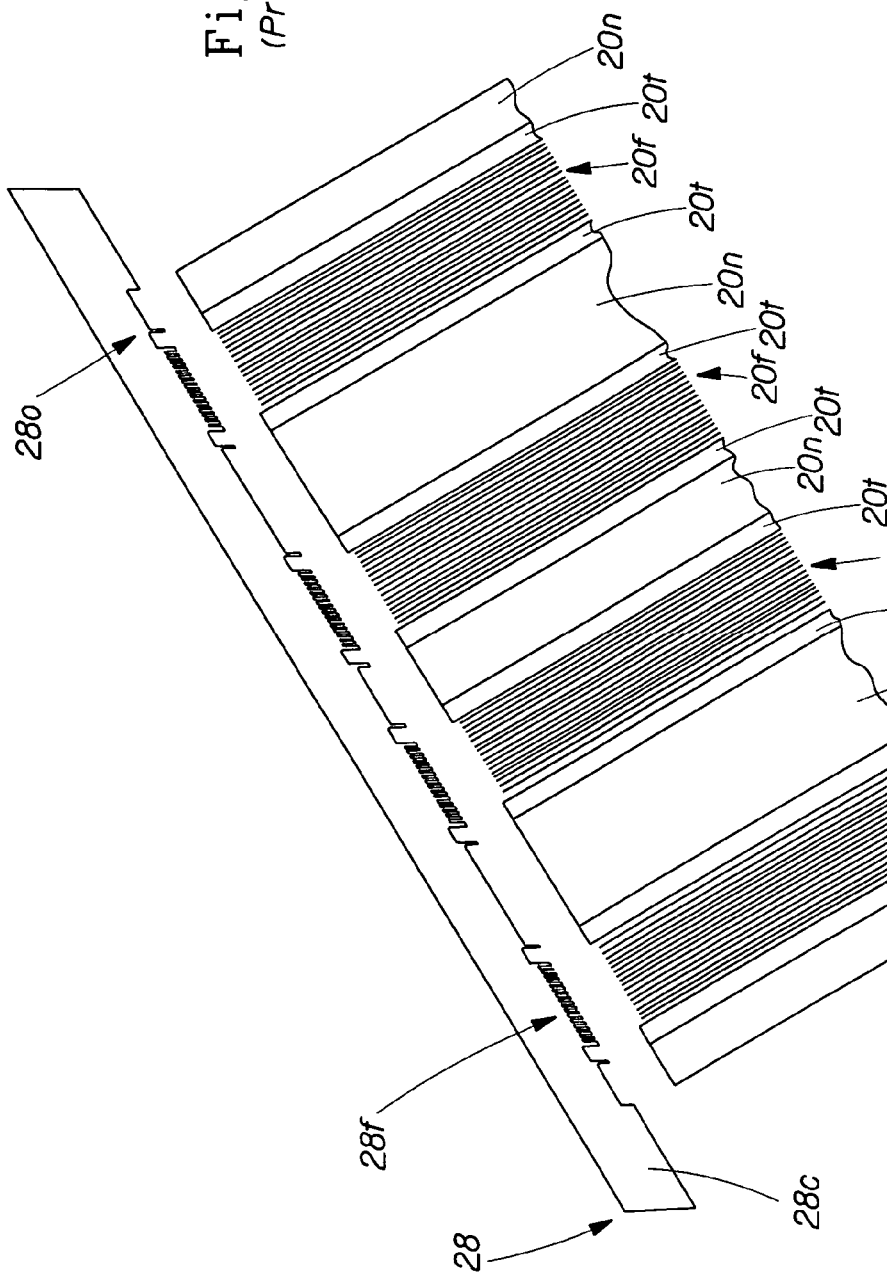
FIG. 1e is a schematic of an exemplary adhesive deposition pattern for that of the conventional adhesive applicator of FIG. 1d.
Figure 1F:
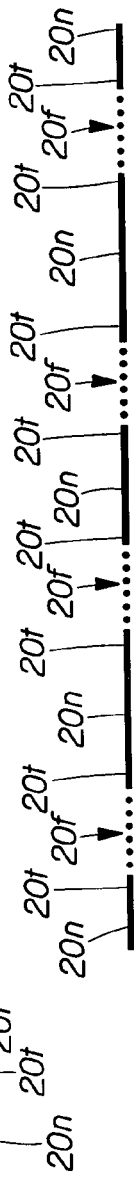
FIG. 1f shows a cross-sectional view of the exemplary adhesive deposition pattern of FIG. 1e.
Figure 1G:
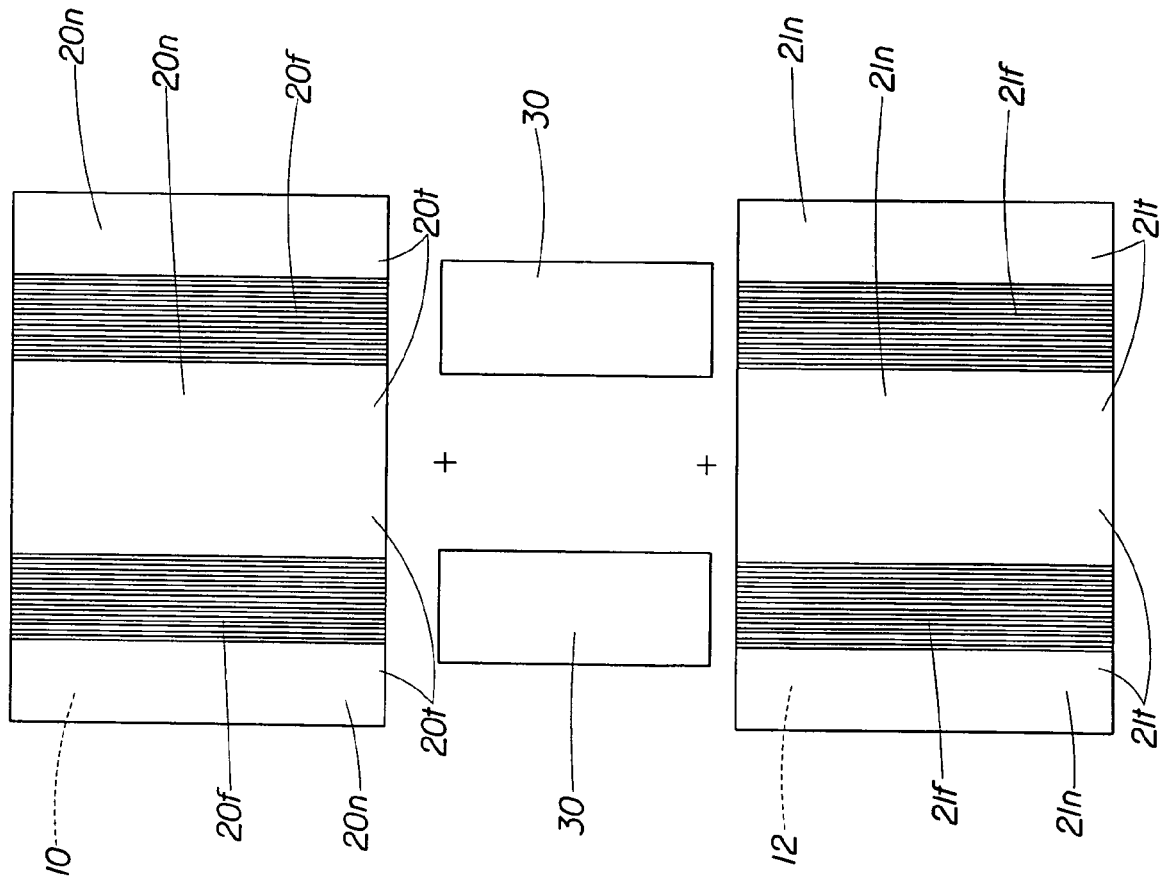
FIG. 1g shows a first and second web of nonwoven material having adhesive; a first and second elastic film is shown interposed said first and second web of nonwoven material to illustrate the alignment of the subsequently made stretch laminate.
Figure 2A:
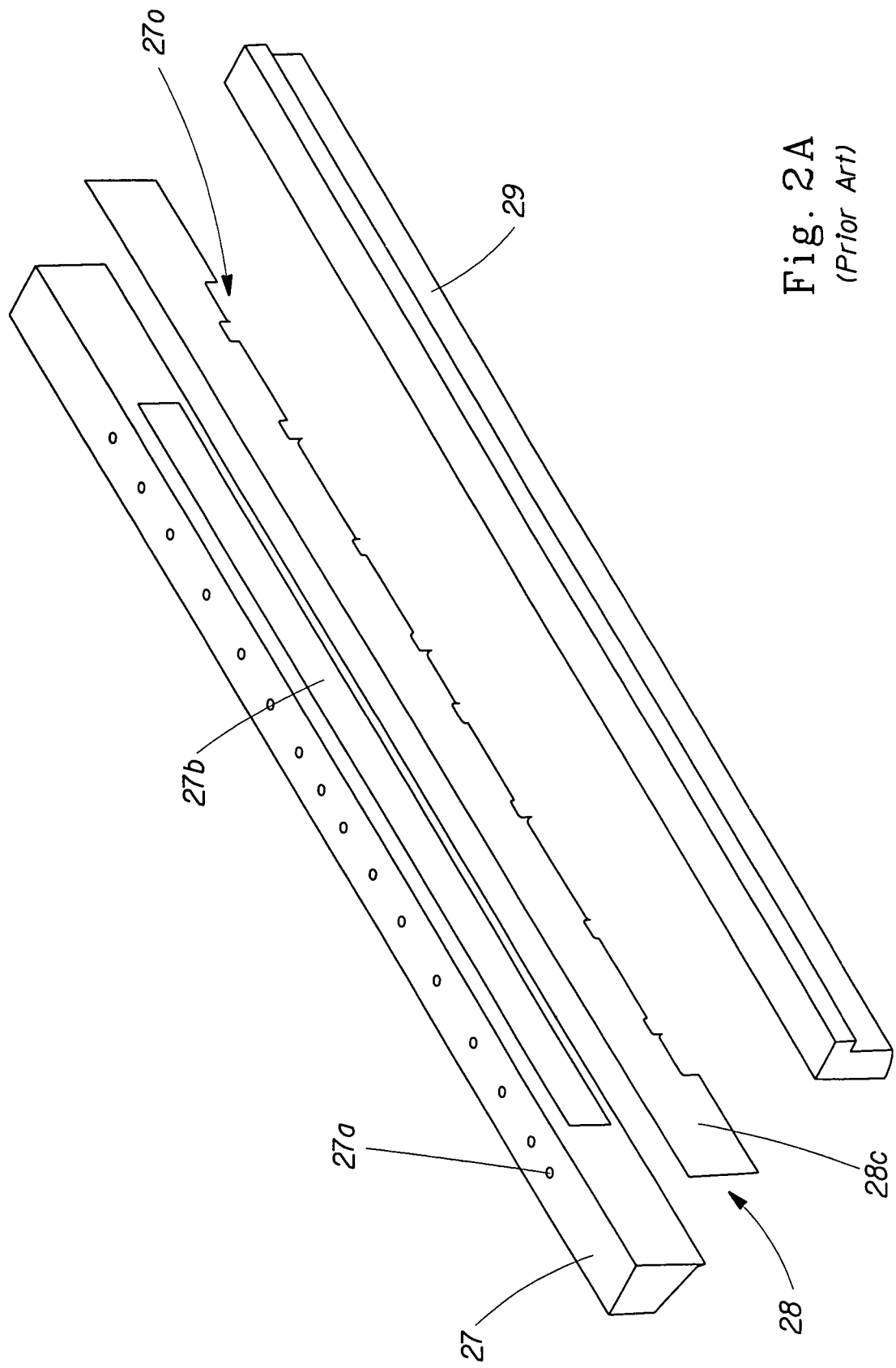
FIG. 2a shows another exemplary exploded view of an alternate adhesive applicator design, namely, the shim consists of open and closed portions without the use of partitioned portions.
Figure 2D:
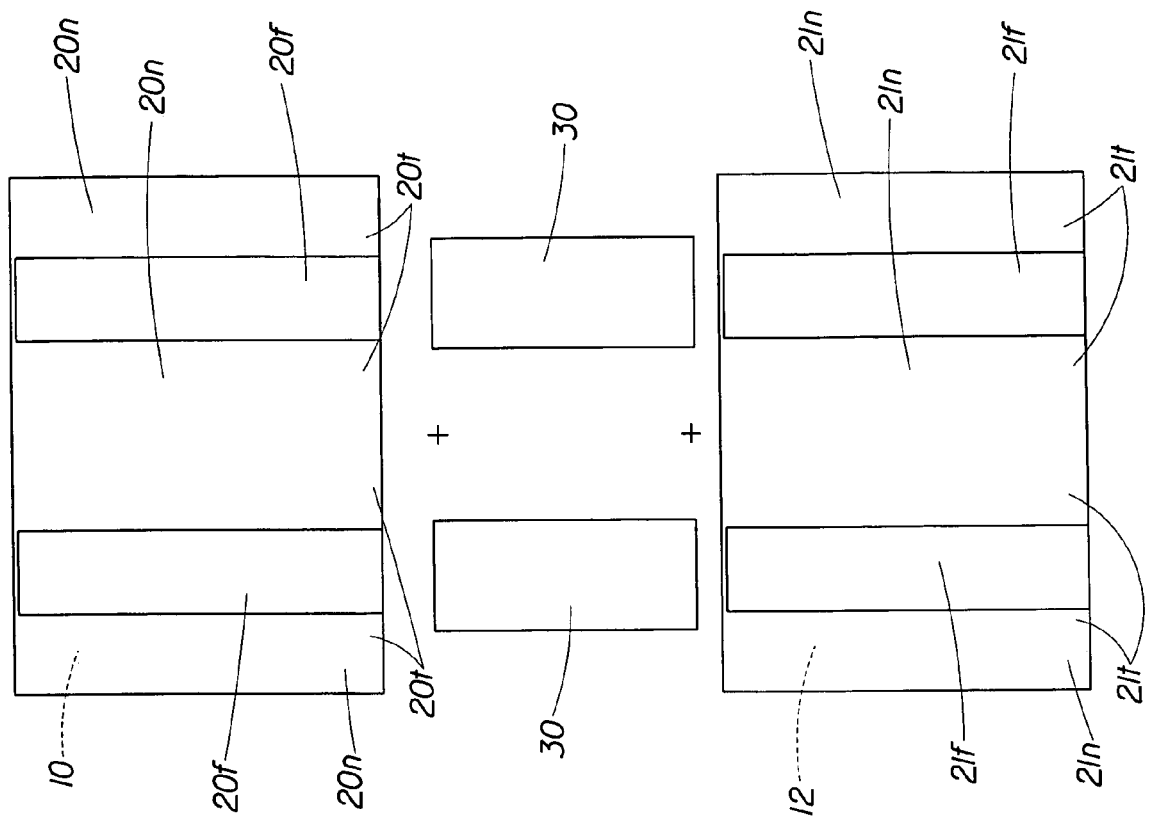
FIG. 2d shows a first and second web of nonwoven material with adhesive applied over the entire surface; a first and second elastic film is interposed between said first and second web of nonwoven material to illustrate the alignment of subsequently made stretch laminates.
Figure 3A:
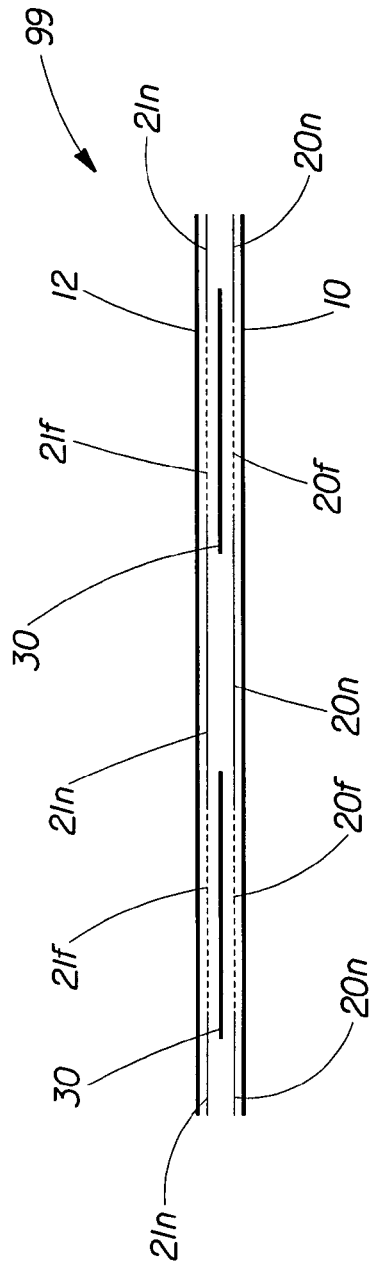
FIG. 3a shows a cross-sectional view of a conventional stretch laminate.
Figure 3B:
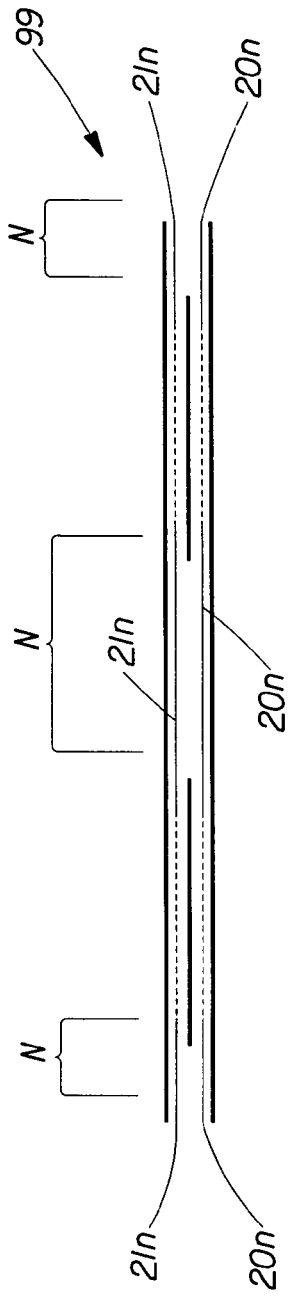
FIG. 3b shows a cross-sectional view of the conventional stretch laminate of FIG. 3a with particular emphasis on adhesive applied laterally outboard of the elastic film.
Figure 3C:
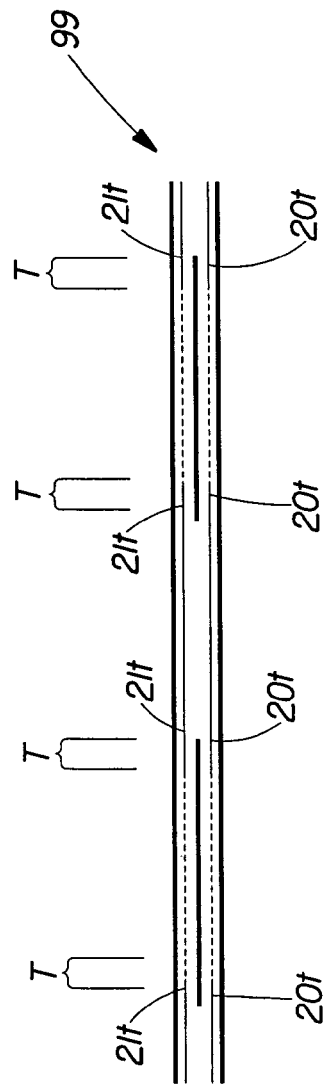
FIG. 3c shows a cross-sectional view of the conventional stretch laminate of FIG. 3a with particular emphasis on adhesive applied near the ends of the elastic film.
Figure 4A:
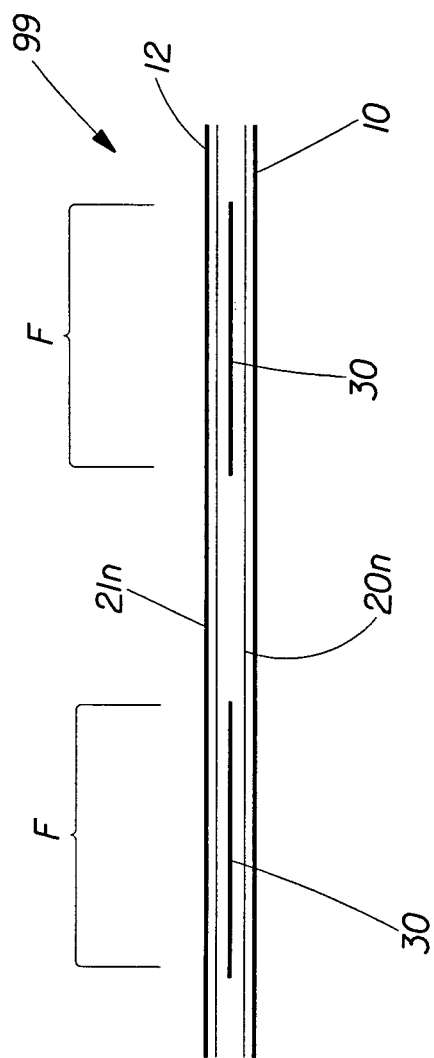
FIG. 4a shows another exemplary, conventional stretch laminate having continuously applied adhesive above and below the elastic film.
Figure 4B:
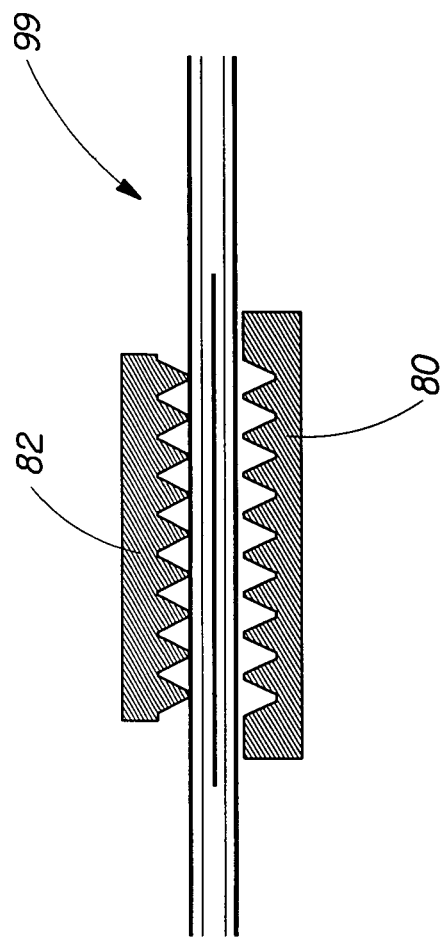

Definitions:

The term "absorbent article" herein refers to devices which absorb and contain body exudates and, more specifically, refers to devices which are placed against or in proximity to the body of the wearer to absorb and contain the various exudates discharged from the body, such as: incontinence briefs, incontinence undergarments, absorbent inserts, diaper holders and liners, feminine hygiene garments and the like.

The term "disposable" is used herein to describe absorbent articles which generally are not intended to be laundered or otherwise restored or reused as absorbent articles (i.e., they are intended to be discarded after a single use and, preferably, to be recycled, composted or otherwise discarded in an environmentally compatible manner).

The term "diaper" herein refers to an absorbent article generally worn by infants and incontinent persons about the lower torso.

The term "pant", as used herein, refers to disposable garments having a waist opening and leg openings designed for infant or adult wearers. A pant may be placed in position on the wearer by inserting the wearer's legs into the leg openings and sliding the pant into position about the wearer's lower torso. A pant may be preformed by any suitable technique including, but not limited to, joining together portions of the article using refastenable and/or non-refastenable bonds (e.g., seam, weld, adhesive, cohesive bond, fastener, etc.). A pant may be preformed anywhere along the circumference of the article (e.g., side fastened, front waist fastened). While the term "pant" is used herein, pants are also commonly referred to as "closed diapers", "prefastened diapers", "pull-on diapers", "training pants" and "diaper-pants". Suitable pants are disclosed in U.S. Pat. No. 5,246,433, issued to Hasse, et al. on Sep. 21, 1993; U.S. Pat. No. 5,569,234, issued to Buell et al. on Oct. 29, 1996; U.S. Pat. No. 6,120,487, issued to Ashton on Sep. 19, 2000; U.S. Pat. No. 6,120,489, issued to Johnson et al. on Sep. 19, 2000; U.S. Pat. No. 4,940,464, issued to Van Gompel et al. on Jul. 10, 1990; U.S. Pat. No. 5,092,861, issued to Nomura et al. on Mar. 3, 1992; U.S. patent application Ser. No. 10/171,249, entitled "Highly Flexible And Low Deformation Fastening Device", filed on Jun. 13, 2002; U.S. Pat. No. 5,897,545, issued to Kline et al. on Apr. 27, 1999; U.S. Pat. No. 5,957,908, issued to Kline et al on Sep. 28, 1999, the disclosure of each of which is incorporated herein by reference.

The term "machine direction (MD)" or "longitudinal" herein refers to a direction running parallel to the maximum linear dimension of the article and/or fastening material and includes directions within ±45° of the longitudinal direction.

The term "cross direction (CD)", "lateral" or "transverse" herein refers to a direction which is orthogonal to the longitudinal direction.

The term "joined" encompasses configurations whereby an element is directly secured to another element by affixing the element directly to the other element, and configurations whereby an element is indirectly secured to another element by affixing the element to intermediate member(s) which in turn are affixed to the other element.

The term "interposed" herein means to place or introduce something between two or more other things.

The term "controllable" herein means a having such precision so as to achieve a tolerance 10% or less, preferably 5% or less. As it relates to adhesive application, being "controllable" means that the target amount of adhesive to be applied is achieved within a tolerance of 10% or less (preferably 5% or less) in the CD direction. As discussed herein, one novel technique includes the use of a plurality of adhesive supplies which are designated to a plurality of shims within the slot of the adhesive applicator.

Description:

FIG. 5a shows a cross-sectional view of a stretch laminate 199 in accordance with the present invention. Stretch laminate 199 comprises a first web of nonwoven material 110 and a second web of a nonwoven material 112. Further, laminate 199 includes at least one elastic film 130 positioned in between said first and second nonwoven materials. In addition, at least two planes of adhesive are applied within said laminate. For instance, a bottom plane of adhesive is shown having continuous and discontinuous regions. More specifically, regions of adhesive which are located laterally outboard of said elastic film 130 is identified as adhesive 120n. Regions of adhesive which are located laterally in board of said elastic film 130 are identified as adhesive 120f. Lastly, regions of adhesive which are located laterally near the ends of elastic film 130 are identified as adhesive 120t. Similarly, a second plane of adhesive may be provided having continuous and discontinuous regions. More specifically, regions of adhesive which are located laterally outboard of said elastic film 130 are identified as adhesive 121n. Regions of adhesive which are located laterally in board of said elastic film 130 are identified as adhesive 121f. Lastly, regions of adhesive which are located laterally near the ends of elastic film 130 are identified as adhesive 121t.

FIG. 5b shows the stretch laminate 199 of FIG. 5a with particular emphasis on the adhesive located laterally outboard of elastic film 130. These particular areas of interest are identified by brackets labeled "N". The amount of adhesive applied within these regions is constrained by two competing interests. First, too much glue within these regions will cause adhesive to bleed through said first and second nonwoven materials. Secondly, not enough glue within these regions will result in poor lamination between said first and second nonwoven materials. As can be seen, elastic film 130 does not extend between adhesive 120n and adhesive 121n such that the amount of adhesive exposed to either nonwoven material is effectively doubled in quantity. Recognizing such fact, however, one cannot merely reduce the amount of adhesive within 120n and 121n because doing so would affect the amount of adhesive above and below elastic film 130. Such competing interests add to the complications of the present invention.

Figure 5C:
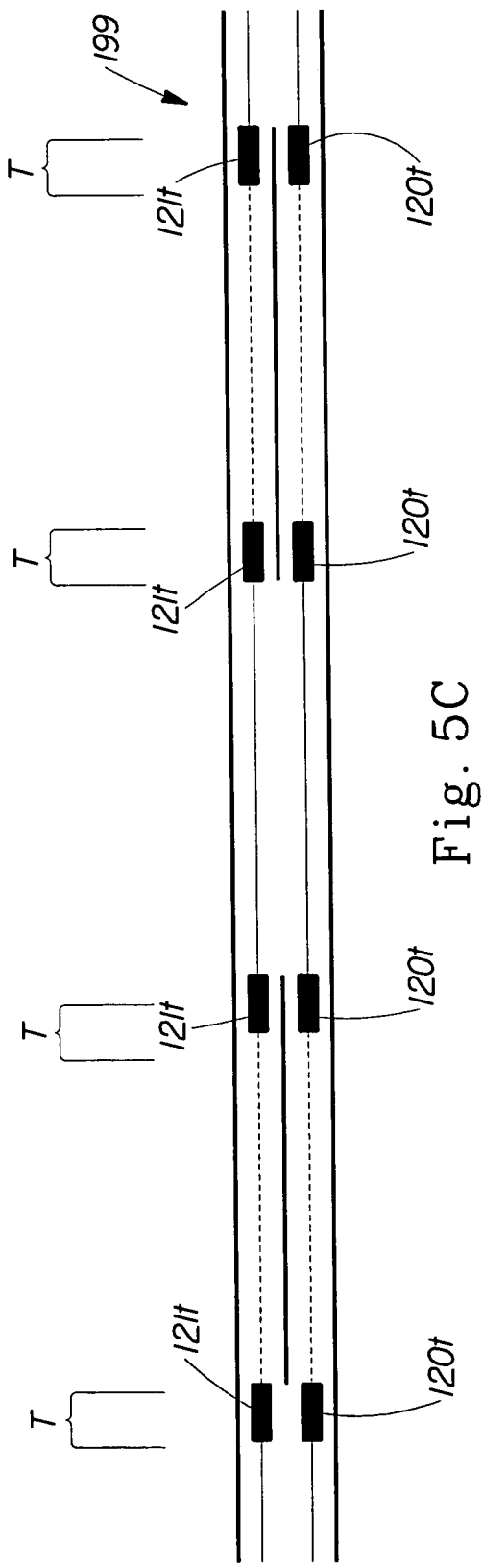
FIG. 5c shows the novel stretch laminate of FIG. 5a with particular emphasis on the adhesive applied near the lateral ends of the elastic film.

FIG. 5c shows the stretch laminate 199 of FIG. 5a with particular emphasis on the adhesive located laterally near the ends of elastic film 130. These particular areas of interest identified by brackets labeled "T". The amounts of adhesive applied within these regions are similarly constrained by concerns of bleed through and insufficient lamination. Furthermore, the amount of adhesive 120t, 121t should be properly maximized so as to provide tackdown functionality for that of elastic film 130. As can be seen, it is often preferable to provide more adhesive within these regions (i.e., tackdown) than that of the amount supplied within the regions 120n, 121n. The novel designed of the manufacturing equipment within the present invention allows for such differences and the amount of adhesive applied within these regions.

Figure 5D:
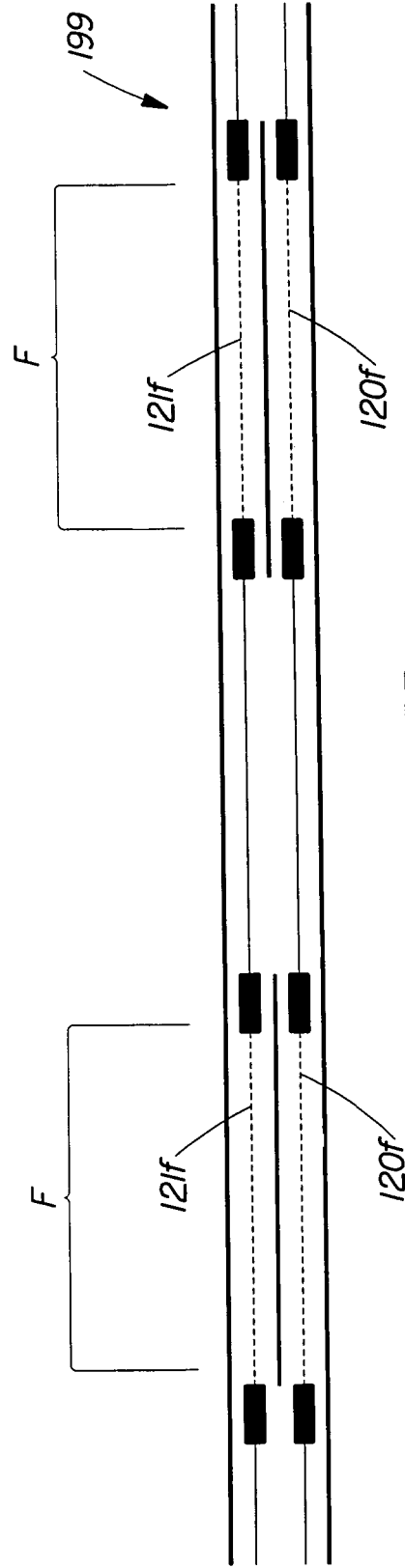
FIG. 5d shows the novel stretch laminate of FIG. 5a with particular emphasis on the adhesive applied laterally in board of the ends of the elastic film.

FIG. 5d shows the stretch laminate 199 of FIG. 5a with particular emphasis on the adhesive located laterally and board to the ends of elastic film 130. These particular areas of interest are identified by brackets labeled "F". The amounts of adhesive applied within these regions are similarly constrained by concerns of bleed through and insufficient lamination. Furthermore the amount of adhesive 120f, 121f should be properly minimized so as to permit the laminate to properly stretch during activation (EG, ring rolling); otherwise, the presence of too much adhesive will result in pinholes within said laminate. The novel design of the manufacturing equipment within the present invention allows for continuous and/or discontinuous application of adhesive 120f, 121f so as to have a amount which is less than that of tackdown adhesive 120t, 121t, respectively.

Figure 5E:
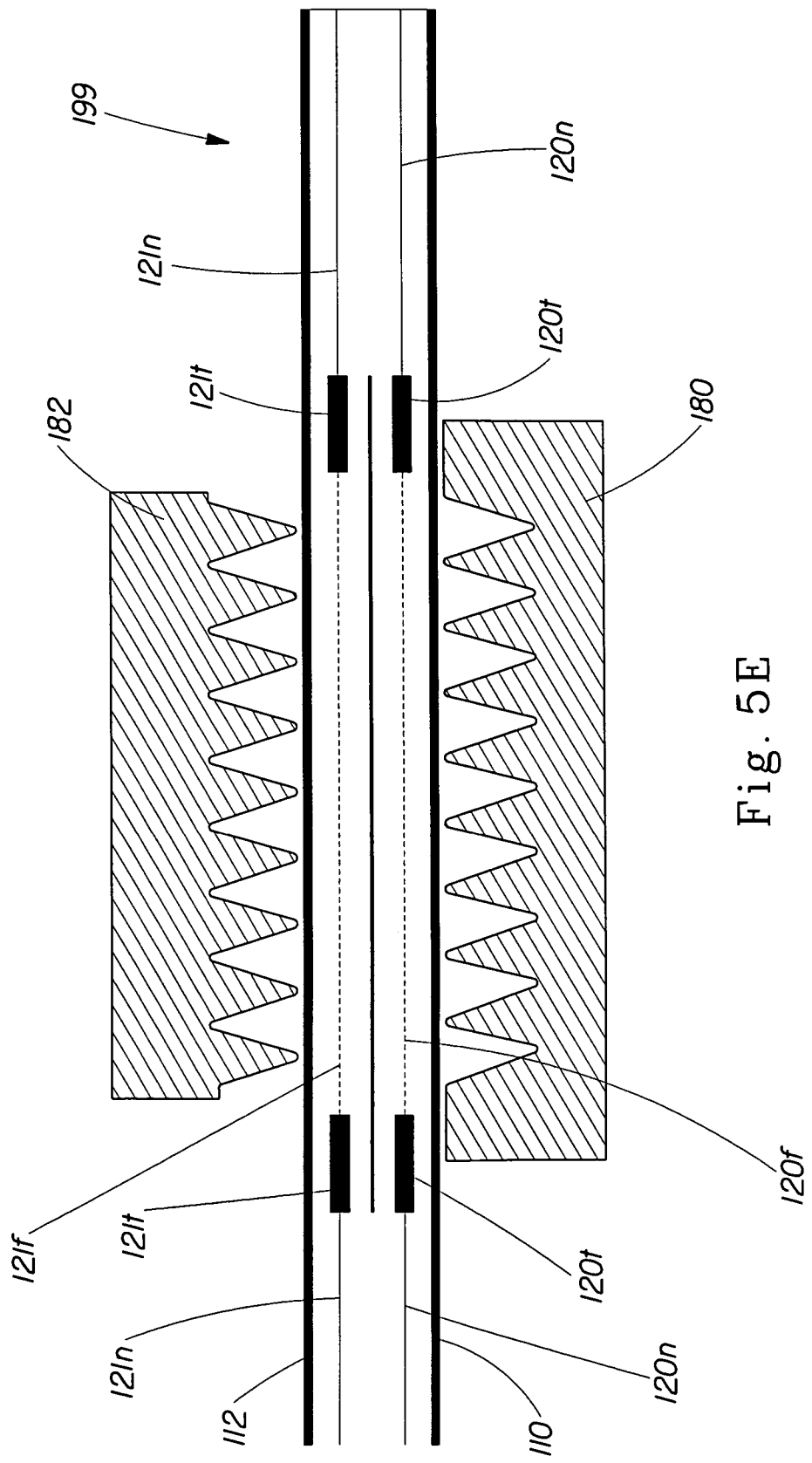

FIG. 5e shows an exemplary activation process in accordance with the present invention. As can be appreciated, the region which is substantially in board of tackdown adhesive 120t, 121t is aligned with the teeth of activation roll 180, 182. In this way, the area of large amounts of adhesive (EG, tackdown adhesive 120t, 121t) may be preserved after activation.

Figure 6A:
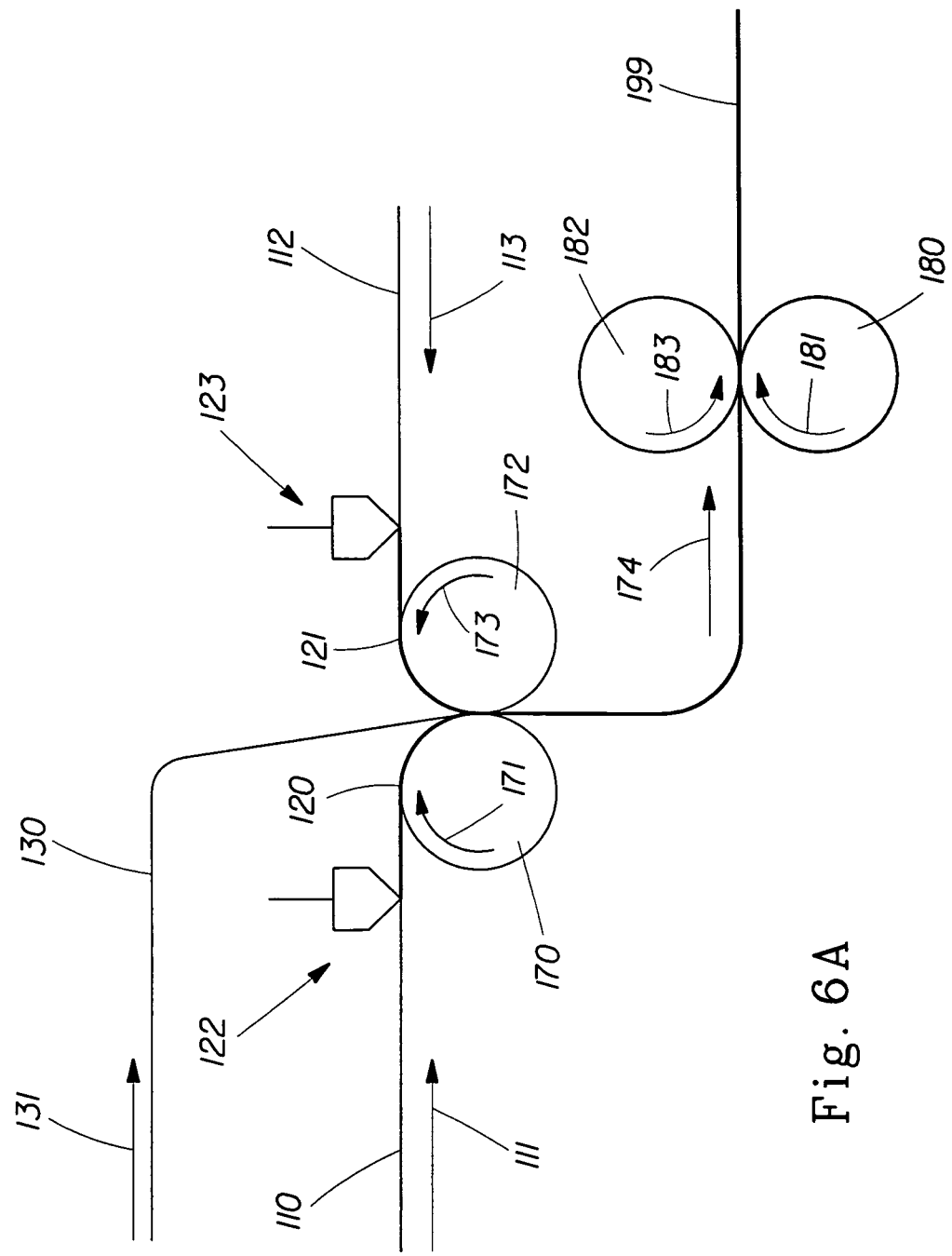
FIG. 6a shows an exemplary manufacturing process in accordance with the present invention.

FIG. 6a shows a schematic of an exemplary manufacturing process 2000 in accordance with the present invention. A first web of nonwoven material 110 is supplied in a direction as indicated by arrow 111. Adhesive 120 is applied to said first nonwoven 110 by way of an adhesive applicator 122. A second web of nonwoven material 112 is supplied in a direction as indicated by arrow 113. Adhesive 121 is applied to said second nonwoven 112 by way of an adhesive applicator 123. A web of elastic film 130 is supplied in a direction as indicated by arrow 131. These three webs of materials are sandwiched together between combining rolls 170, 172. Said combining rolls rotate in a direction as indicated by arrows 171, 173, respectively. Once these three webs of materials are sandwiched together, they are subsequently activated between activation rolls 180, 182. Said activation rolls rotate in a direction as indicated by arrows 181, 183, respectively. Activation of said webs by way of activation rolls 180, 182 is sometimes referred to as "ring rolling". After said activation, the resulting product is a stretch laminate 199.

FIG. 6b shows an exemplary applicator adhesive 122 from that of FIG. 1a. Adhesive applicator 122 may comprise of a manifold 124, a plurality of adhesive inlets 125a-c and a slot 126. Referring now to FIG. 6c, slot 126 may comprise of a backplate 127, a plurality of shims 128 and a frontplate 129. Referring now to FIG. 6d, an exploded view of slot 126 is shown. As can be seen, backplate 127 may comprise of a plurality of adhesive inlet ports 127a, 127b and 127c. Adhesive may be introduced into slot 126 through said adhesive inlet ports. In this particular embodiment, adhesive inlet 125a is in fluid communication with adhesive inlet ports 127a. The same is true for adhesive inlets 125b and 125c with adhesive inlet ports 127b and 127c, respectively. Said adhesive may then exit through corresponding adhesive outlet ports, whereupon the adhesive will come into contact with a plurality of shims 128. Shims 128 may consist of multiple portions including a closed portion 128c, an open portion 128t for deposition of tackdown adhesive 120t, an open position 128n for deposition of nonwoven adhesive 120n and a partitioned portion 128f for deposition of film adhesive 120f. In this manner, separate adhesive supplies may be provided to the various portions so as to properly provide predictable and differing amounts of adhesive in accordance with the present invention.

FIG. 6e shows the exemplary shims 128 from that of FIG. 6d. Further, exemplary depositions of adhesive are shown having exited through shims 128. For instance, adhesive intended to be placed between said first and second nonwoven materials and also laterally outboard of elastic film 130 is identified as 120n. Additionally, adhesive intended to be placed between said first and second nonwoven materials and also near the outboard edges of elastic film 130 is identified as 120t. Finally, adhesive intended to be placed between said first and second nonwoven materials and also laterally positioned inboard the edges of elastic film 130 is identified as 120f. Referring now to FIG. 6f, a cross-sectional view of the adhesive deposition patterned from FIG. 6e is shown. As can be appreciated from this cross-sectional view, the adhesive within the region intended to be placed above or below elastic film 130 is discontinuous while the adhesive in the other regions is continuous. Further, the amount of tackdown adhesive 120t is greater than the amount of nonwoven adhesive 120n. Unlike conventional apparatus, the adhesive applicator design of the present invention provides separate adhesive supplies to the various portions so as to properly provide predictable and differing amounts of adhesive in accordance with the present invention.

Figure 6G:
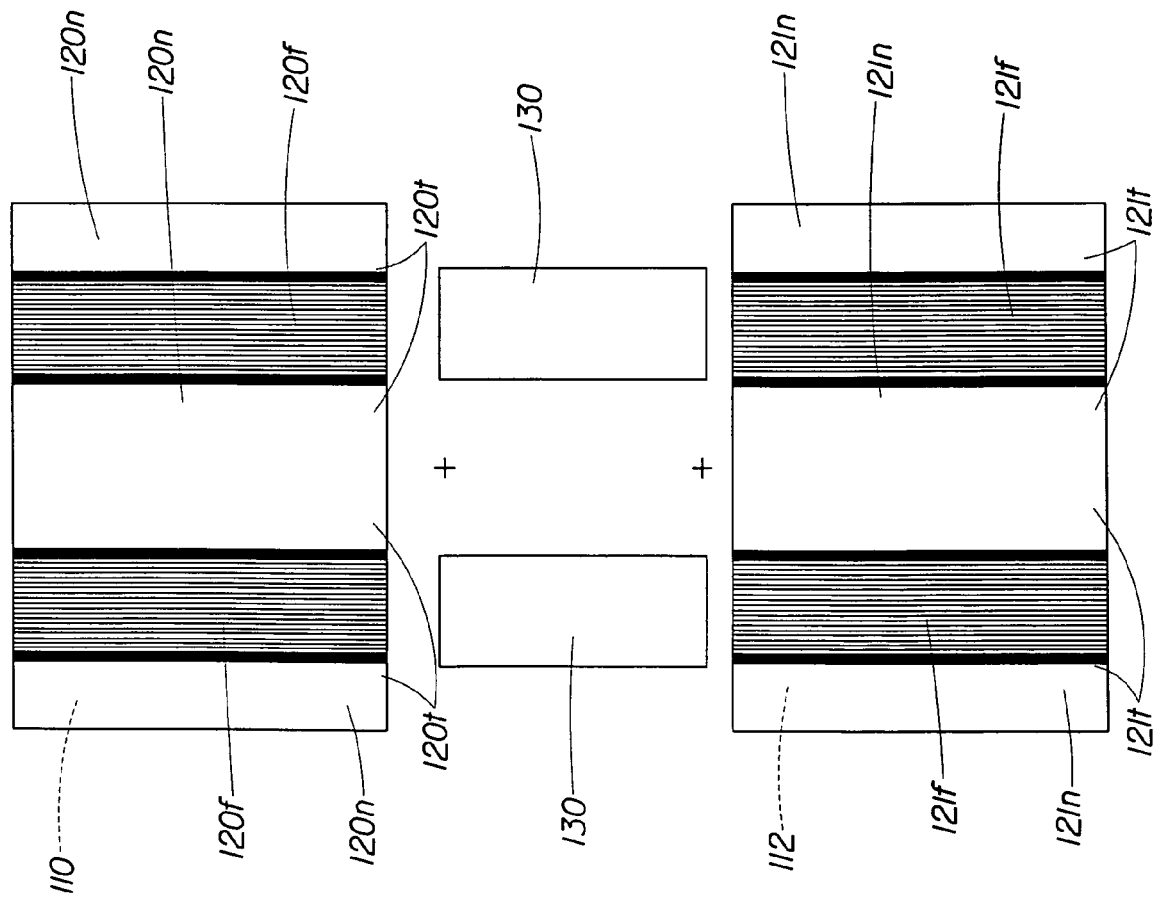
FIG. 6g shows a first and second web of nonwoven material having adhesive applied in accordance with the present invention; a first and second elastic film is positioned interposed between said first and second web of nonwoven material in accordance with the present invention.

FIG. 6g shows the first web of nonwoven material 110 having regions of adhesive. For example, a full coverage of adhesive 120n is applied in the areas surrounding the subsequent placement of elastic film 130. In the areas which will be underneath the subsequent placement of elastic film 130, a partial coverage of adhesive 120f is applied. In this particular example, a series of parallel lines of adhesive is applied. Similar to the first web of nonwoven material 110, the second web of nonwoven material 112 also has regions of adhesive. For example, a full coverage of adhesive 121n is applied in the areas surrounding the subsequent placement of elastic film 130. In the areas which will be underneath the subsequent placement of elastic film 130, a partial coverage of adhesive 121f is applied. In this particular example, a series of parallel lines of adhesive is applied. As is also shown in this conventional embodiment, two webs of elastic film 130 are aligned with said parallel lines of adhesive 120f, 121f. Partial application of adhesive in this manner is important because these regions will be subjected to ring rolling as discussed above; therefore, these regions of material must be sufficiently elastic so as not to create pinholes. The areas of full coverage 120n, 121n will not be significantly activated, rather these areas of full coverage provide for maximum adherence of first and second nonwoven materials. A full coverage of tackdown adhesive 120t of greater amount than that of nonwoven adhesive 120n is applied in near the longitudinal edges of the subsequently placed elastic film 130.

FIG. 6h shows another exemplary slot 226 comprising of a backplate 227, a plurality of shims 228 and a frontplate 229. As can be seen, backplate 227 may comprise of a plurality of adhesive inlet ports 227a, 227b and 227c. Adhesive may be introduced into slot 226 through said adhesive inlet ports. In this particular embodiment, adhesive inlet 225a is in fluid communication with adhesive inlet ports 227a. The same is true for adhesive inlets 225b and 225c with adhesive inlet ports 227b and 227c, respectively. Said adhesive may then exit through corresponding adhesive outlet ports, whereupon the adhesive will come into contact with a plurality of shims 228. Shims 228 may consist of multiple portions including a closed portion 228c, an open portion 228t for deposition of tackdown adhesive 220t, an open position 228n for deposition of nonwoven adhesive 220n and an open portion 228f for deposition of film adhesive 220f. In this manner, separate adhesive supplies may be provided to the various portions so as to properly provide predictable and differing amounts of adhesive in accordance with the present invention.

FIG. 6*i* shows the exemplary shims 228 from that of FIG. 6*h*. Further, exemplary depositions of adhesive are shown having exited through shims 228. For instance, adhesive intended to be placed between said first and second nonwoven materials and also laterally outboard of elastic film 230 is identified as 220*n*. Additionally, adhesive intended to be placed between said first and second nonwoven materials and also near the outboard edges of elastic film 230 is identified as 220*t*. Finally, adhesive intended to be placed between said first and second nonwoven materials and also laterally positioned inboard the edges of elastic film 230 is identified as 220*f*. Referring now to FIG. 6*j*, a cross-sectional view of the adhesive deposition patterned from FIG. 6*i* is shown. As can be appreciated from this cross-sectional view, the adhesive within the region intended to be placed above or below elastic film 230 is continuous and having a deposition amount less than that of tackdown adhesive 220*t*. Further, the amount of tackdown adhesive 220*t* is greater than the amount of nonwoven adhesive 220*n*. Unlike conventional apparatus, the adhesive applicator design of the present invention provides separate adhesive supplies to the various portions so as to properly provide predictable and differing amounts of adhesive in accordance with the present invention.

Figure 6K:
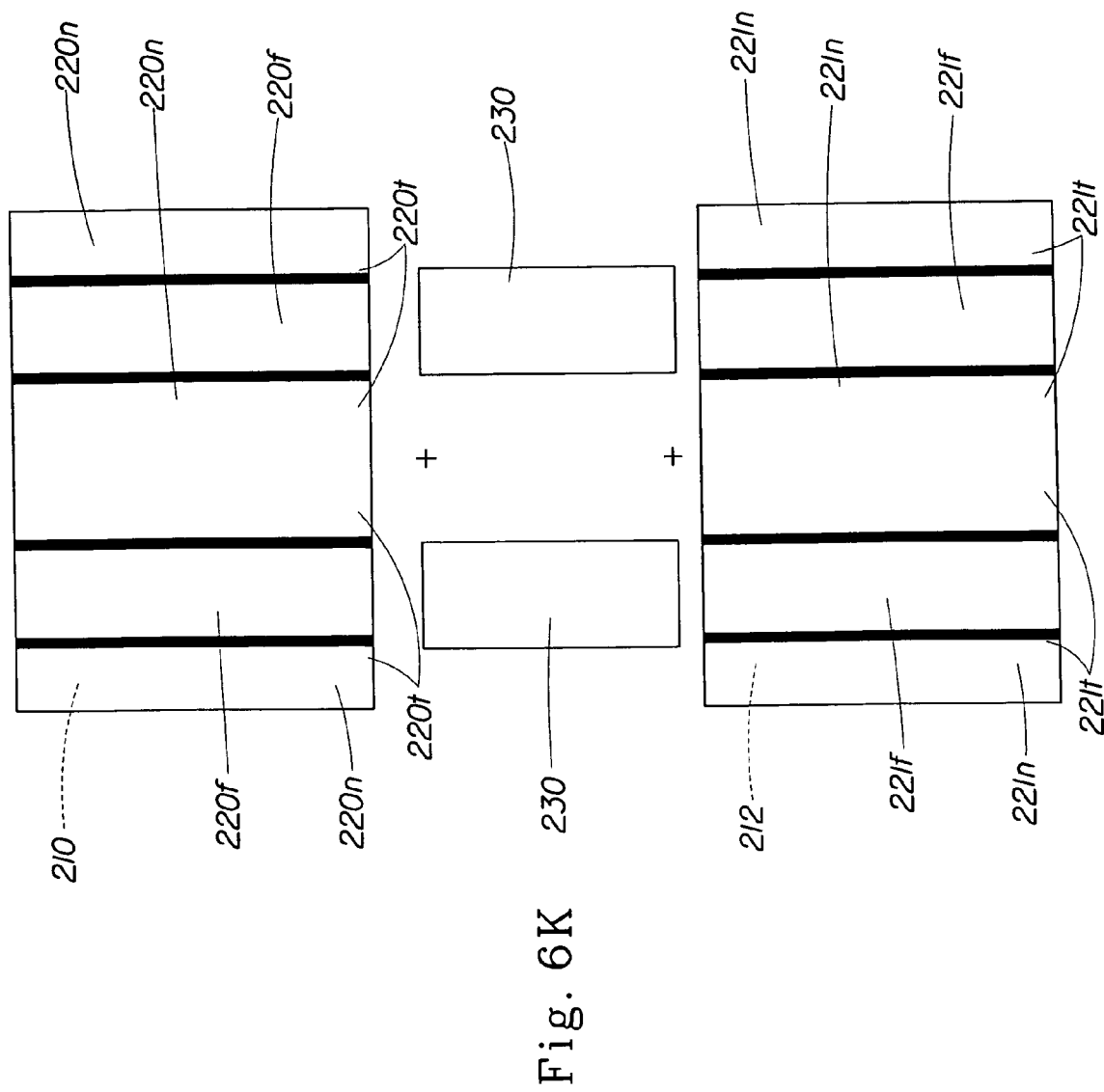
FIG. 6k shows a first and second web of nonwoven material having adhesive applied in accordance with the present invention; a first and second elastic film is positioned interposed of said first and second web of nonwoven material.

FIG. 6*k* shows the first web of nonwoven material 210 having regions of adhesive. For example, a full coverage of adhesive 220*n* is applied in the areas surrounding the subsequent placement of elastic film 230. In the areas which will be underneath the subsequent placement of elastic film 230, a full coverage of adhesive 220*f* is applied but in an amount less than the amount of tackdown adhesive 220*t*. Similar to the first web of nonwoven material 210, the second web of nonwoven material 122 also has regions of adhesive. For example, a full coverage of adhesive 221*n* is applied in the areas surrounding the subsequent placement of elastic film 230. In the areas which will be underneath the subsequent placement of elastic film 230, a full coverage of adhesive 221*f* is applied but in an amount less than the amount of tackdown adhesive 221*t*. As is also shown in this novel embodiment, two webs of elastic film 230 are aligned with said lesser amount of adhesive 220*f*, 221*f*. Lesser application of adhesive in this manner is important because these regions will be subjected to ring rolling as discussed above; therefore, these regions of material must be sufficiently elastic so as not to create pinholes. The areas of full coverage 220*n*, 221*n* will not be significantly activated, rather these areas of full coverage provide for maximum adherence of first and second nonwoven materials. A full coverage of tackdown adhesive 220*t* of greater amount than that of nonwoven adhesive 220*n* is applied in near the longitudinal edges of the subsequently placed elastic film 230.

Figure 7A:
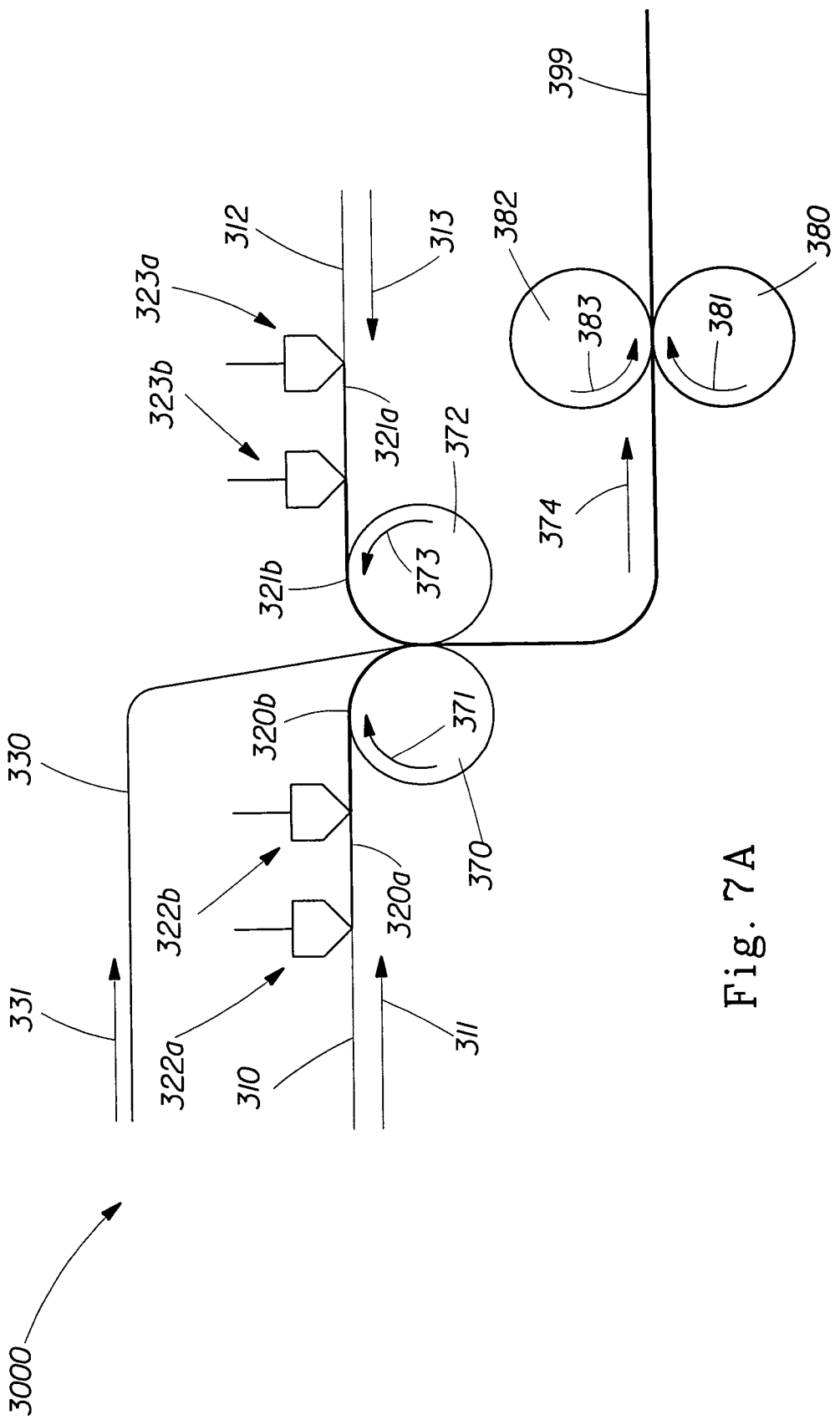
FIG. 7a shows another exemplary manufacturing process in accordance with the present invention; this particular exemplary process includes the application of additional adhesive layers.

FIG. 7*a* shows another schematic of an exemplary manufacturing process 3000 in accordance with the present invention. A first web of nonwoven material 310 is supplied in a direction as indicated by arrow 311. A first adhesive 320*a* is applied to said first nonwoven 310 by way of an adhesive applicator 322*a*. A second adhesive 320*b* is also applied to said first nonwoven 310 by way of an adhesive applicator 322*b*. A second web of nonwoven material 312 is supplied in a direction as indicated by arrow 313. A first adhesive 321*a* is applied to said second nonwoven 312 by way of an adhesive applicator 323*a*. A second adhesive 321*b* is also applied to said second nonwoven 312 by way of an adhesive applicator 323*b*. A web of elastic film 330 is supplied in a direction as indicated by arrow 331. These three webs of materials are sandwiched together between combining rolls 370, 372. Said combining rolls rotate in a direction as indicated by arrows 371, 373, respectively. Once these three webs of materials are sandwiched together, they are subsequently activated between activation rolls 380, 382. Said activation rolls rotate in a direction as indicated by arrows 381, 383, respectively. Activation of said webs by way of activation rolls 380, 382 is sometimes referred to as "ring rolling". After said activation, the resulting product is a stretch laminate 399.

Figure 7B:
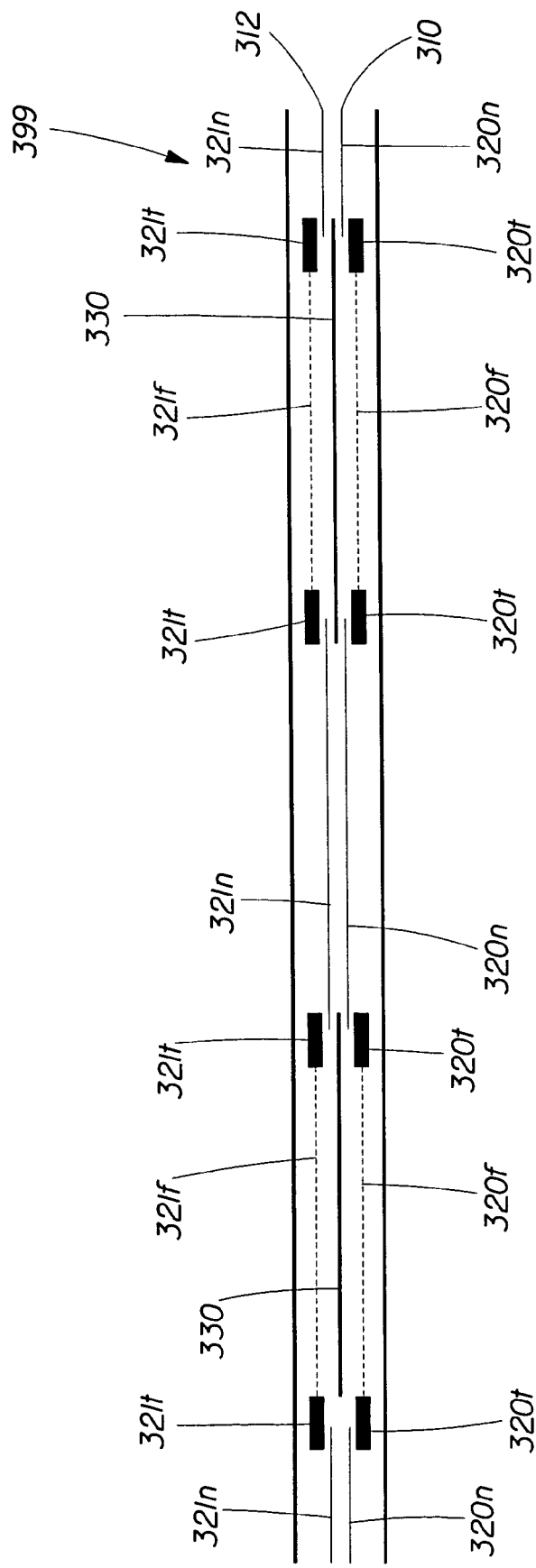
FIG. 7b is a cross-sectional view of another exemplary, novel stretch laminate made from the process of FIG. 7a in accordance with the present invention.

FIG. 7*b* shows a cross-sectional view of a stretch laminate 299 in accordance with the present invention. Stretch laminate 299 comprises a first web of nonwoven material 210 and a second web of a nonwoven material 212. Further, laminate 299 includes at least one elastic film 230 positioned in between said first and second nonwoven materials. In addition, at least four planes of adhesive are applied within said laminate. For instance, a first-bottom plane of adhesive is shown having continuous and discontinuous regions. More specifically, regions of adhesive which are located laterally inboard of said elastic film 230 are identified as adhesive 220*f* and regions of adhesive which are located laterally near the ends of elastic film 230 are identified as adhesive 220*t*. A second plane of adhesive is shown having continuous regions of adhesive which are located laterally outboard of said elastic film 230 and are identified as adhesive 220*n*. Similarly, a third plane of adhesive is shown having continuous regions of adhesive which are located laterally outboard of said elastic film 230 and are identified as adhesive 221*n*. Lastly, a fourth-top plane of adhesive may be provided having continuous and discontinuous regions. More specifically, regions of adhesive which are located laterally inboard of said elastic film 230 are identified as adhesive 221*f* and regions of adhesive which are located laterally near the ends of elastic film 230 are identified as adhesive 121*t*. Laminate 299 may be made from the manufacturing process of FIG. 7*a*. Alternatively, the increased amount of adhesive within the tackdown region may be accomplished by overlapping a first deposition for the film adhesive and a second deposition for the nonwoven adhesive. An additional benefit of overlapping said depositions is the assurance that no significant gap (i.e., absence of adhesive) is present in the laminate thus resulting in a weak spot in the laminate.

Product Applications

One skilled in the art would appreciate that the stretch laminates of the present invention may be used in a multitude of applications including, but not limited to, disposable absorbent articles, body wraps, clothing, feminine hygiene products, and bandages. However, it is particularly beneficial for disposable absorbent articles, more specifically with respect to its use in the construction of a waist region and/or fastener.

All documents cited are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

For example, one skilled in the art would appreciate that the number of multiple shims and the number of multiple adhesive supplies may be varied to meet the particulars of a given situation and need.

Additionally, one skilled in the art would also appreciate that the elastic film may be applied discontinuously (e.g., via a cut and slip device) to either the first and/or second nonwoven material, or applied to another nonwoven web (e.g., carrier web) which is ultimately interposed between the first and second nonwoven materials.

Additionally, one skilled in the art would also appreciate that either contact or non-contact adhesive applicators may be used.

Additionally, one skilled in the art would also appreciate that discontinuous application (e.g., film adhesive deposition) of adhesive may be accomplished in the CD and/or MD directions.

Additionally, while slot coat adhesive applicators were primarily discussed herein, one skilled in the art would appreciate that other types of adhesive applicators may be used to accomplish the novel deposition designs disclosed herein. Such applicators include, but are not limited to, gravure applicators and spray applicators.

Additionally, one skilled in the art would appreciate that increased amounts of adhesive may be applied when the stretch laminate is to be affixed to another material. For example, when the stretch laminate is a tab portion within a disposable diaper needing to be affixed to a chassis, an increased amount of adhesive may be used to impart additional strength in this bond.

What is claimed is:

1. A stretch laminate comprising:
   a first nonwoven material;
   a second nonwoven material;
   an elastic film; said elastic film being interposed between said first and second nonwoven material, said elastic film having a first longitudinal side edge and a second longitudinal side edge, wherein portions of said first and second nonwoven materials extend laterally outboard of said first and second longitudinal side edges of said elastic film;
   a first plane of adhesive having differing amounts of adhesive as measured laterally within the stretch laminate, said first plane of adhesive being interposed between said first nonwoven material and said elastic film,
   a second plane of adhesive having differing amounts of adhesive as measured laterally within the stretch laminate said second plane of adhesive being interposed between said second nonwoven material and said elastic film;
   wherein at least one of said first plane of adhesive or said second plane of adhesive comprises:
   a first portion of adhesive being laterally located between said first and second longitudinal side edges of said elastic film, said first portion of adhesive being defined as film adhesive;
   a second portion of adhesive being laterally located near at least one longitudinal side edge of said elastic film and inboard of said at least one longitudinal side edge, said second portion of adhesive being defined as tackdown adhesive; and
   a third portion of adhesive being a laterally located outboard of said longitudinal side edges of said elastic film to adhere the portions of the first nonwoven material extending laterally outboard of the first and second longitudinal side edges of said elastic film to corresponding portions of the second nonwoven material extending laterally outboard of the first and second longitudinal side edges of said elastic film, said third portion of adhesive being defined as nonwoven adhesive;
   wherein the tackdown adhesive is present in an amount greater than an amount of the film adhesive and greater than an amount of the nonwoven adhesive;
   wherein the film adhesive is discontinuous, the tackdown adhesive is continuous, and the nonwoven adhesive is continuous;
   wherein each of the above elements being substantially laminated together to form a laminate;
   wherein said laminate is activated to form the stretch laminate.

2. The stretch laminate of claim 1 wherein the other of said first plane of adhesive or said second plane of adhesive comprises:
   a first portion of adhesive being laterally located between said first and second longitudinal side edges of said elastic film, said first portion of adhesive being defined as film adhesive;
   a second portion of adhesive being laterally located near at least one longitudinal side edge of said elastic film, said second portion of adhesive being defined as tackdown adhesive; and
   a third portion of adhesive being laterally located outboard of said longitudinal edges of said elastic film, said third portion of adhesive being defined as nonwoven adhesive.

3. The stretch laminate of claim 2 wherein said nonwoven adhesive has an application amount less than that of said tackdown adhesive.

4. A stretch laminate comprising;
   a first nonwoven material;
   a second nonwoven material;
   an elastic film; said elastic film being interposed between said first and second nonwoven material, said elastic film having a first longitudinal side edge and a second longitudinal side edge, wherein portions of said first and second nonwoven materials extend laterally outboard of said first and second longitudinal side edges of said elastic film;
   a first plane of adhesive, said first plane of adhesive being interposed between said first nonwoven material and said elastic film;
   a second plane of adhesive, said second plane of adhesive being interposed between said first nonwoven material and said elastic film, wherein said first and second plane of adhesive have differing amounts of adhesive from each other as measured laterally within the stretch laminate;
   a third plane of adhesive, said third plane of adhesive being interposed between said second nonwoven material and said elastic film;
   a fourth plane of adhesive, said fourth plane of adhesive being interposed between said second nonwoven material and said elastic film, wherein said third and fourth plane of adhesive have differing amounts of adhesive from each other as measured laterally within the stretch laminate;
   wherein said first and fourth planes of adhesive comprise:
   a first portion of adhesive being laterally located between said first and second longitudinal side edges of said elastic film, said first portion of adhesive being defined as film adhesive; and
   a second portion of adhesive being laterally located near at least one longitudinal side edge of said elastic film and inboard of said at least one longitudinal side edge, said second portion of adhesive being defined as tackdown adhesive;
   wherein said second and third planes of adhesive comprise of adhesive being laterally located outboard of said longitudinal side edges of said elastic film to adhere the portions of the first nonwoven material extending laterally outboard of the first and second longitudinal side edges of said elastic film to corresponding portions of the second nonwoven material extending laterally outboard of the first and second longitudinal side edges of said elastic film, said second and third planes of adhesive being defined as nonwoven adhesive;

wherein the tackdown adhesive is present in an amount greater than an amount of the film adhesive and greater than an amount of the nonwoven adhesive;

wherein at least one of said first plane of adhesive, said second plane of adhesive, said third plane of adhesive, or said fourth plane of adhesive is applied through an adhesive applicator having a plurality of shims designated for application of said film adhesive, said tackdown adhesive, and or said nonwoven adhesive;

wherein the film adhesive is discontinuous, the tackdown adhesive is continuous, and the nonwoven adhesive is continuous;

wherein each of the above elements being substantially laminated together to form a laminate;

wherein said laminate is activated to form the stretch laminate.

5. The stretch laminate of claim 1, wherein said laminate is activated in a cross direction of said laminate.

6. The stretch laminate of claim 5, wherein the laminate is activated between the longitudinal side edges of said elastic film.

7. The stretch laminate of claim 4, wherein said laminate is activated in a cross direction of said laminate.

8. The stretch laminate of claim 7, wherein the laminate is activated between the longitudinal side edges of said elastic film.

9. A stretch laminate comprising:
a first nonwoven material having a top surface, a bottom surface, a length and width;
a second nonwoven material having a top surface, a bottom surface, a length and width;
an elastic film having a top surface, a bottom surface, a length and width, wherein the width of said elastic film is less than the width of said first and second nonwoven materials; wherein said elastic film is disposed between said first and second nonwoven material, said elastic film having a first longitudinal side edge and a second longitudinal side edge; and
a first plane of adhesive present on the bottom surface of said first nonwoven material, wherein a portion of said first plane of adhesive is disposed between at least a portion of the bottom surface of said first nonwoven material and at least a portion of the top surface of said second nonwoven material and wherein another portion of said first plane of adhesive is disposed between at least a portion of the bottom surface of said first nonwoven material and at least a portion of the top surface of said elastic film,
wherein said first plane of adhesive comprises:
a first tackdown adhesive portion that is disposed inboard said first longitudinal side edge of said elastic film and is adjacent said first longitudinal side edge of said elastic film;
a second tackdown adhesive portion that is disposed inboard said second longitudinal side edge of said elastic film and is adjacent said second longitudinal side edge of said elastic film;
a film adhesive portion that is disposed between said first tackdown adhesive portion and said second tackdown adhesive portion, wherein said film adhesive portion comprises a plurality of lines of adhesive that are substantially parallel to a machine direction of said first nonwoven material;
a first nonwoven adhesive portion that is disposed outboard of said first longitudinal side edge of said elastic film; and
a second nonwoven adhesive portion that is disposed outboard of said second longitudinal side edge of said elastic film,
wherein said film adhesive portion is discontinuous, the first and second. tackdown adhesive portions are continuous, and the first and second nonwoven adhesive portions are continuous;
wherein said first nonwoven material said elastic film and said second nonwoven material are joined to form a laminate.

10. The stretch laminate according to claim 9 comprising a second plane of adhesive present on the top surface of said second nonwoven material, wherein a portion of said second plane of adhesive is disposed between at least a portion of the bottom surface of said first nonwoven material and at least a portion of the top surface of said second nonwoven material and wherein another portion of said second plane of adhesive is disposed between at least a portion of the top surface of said second nonwoven material and at least a portion of the bottom surface of said elastic film,
wherein said second plane of adhesive comprises:
a first tackdown adhesive portion that is disposed inboard said first longitudinal side edge of said elastic film and is adjacent said first longitudinal side edge of said elastic film;
a second tackdown adhesive portion that is disposed inboard said second longitudinal side edge of said elastic film and is adjacent said second longitudinal side edge of said elastic film;
a film adhesive portion that is disposed between said first and second tackdown adhesive portions of said second plane of adhesive. wherein said film adhesive portion comprises a plurality of lines of adhesive that are substantially parallel to a machine direction of said second nonwoven material;
a first nonwoven adhesive portion that is disposed outboard of said first longitudinal side edge of said elastic film; and
a second nonwoven adhesive portion that is disposed outboard of said second longitudinal side edge of said elastic film,
wherein said film adhesive portion is discontinuous, the first and second tackdown adhesive portions are continuous, and the first and second nonwoven adhesive portions are continuous.

11. The stretch laminate according to claim 10 wherein said laminate is activated in a cross direction of said laminate between said first and second tackdown adhesive portions of said first plane of adhesive and between said first and second tackdown adhesive portions of said second plane of adhesive.

12. The stretch laminate according to claim 9 further comprising a second elastic film having a top surface, a bottom surface, a length and width, wherein the width of said elastic film is less than the width of said first and second nonwoven materials; wherein said elastic film is disposed between said first and second nonwoven material, said second elastic film having a first longitudinal side edge and a second longitudinal side edge, wherein said second elastic film is disposed laterally away from said first elastic film.

* * * * *